United States Patent
Li et al.

(10) Patent No.: US 11,356,992 B2
(45) Date of Patent: Jun. 7, 2022

(54) COMMUNICATION METHOD, TERMINAL DEVICE, AND NETWORK DEVICE

(71) Applicant: HUAWEI TECHNOLOGIES CO., LTD., Guangdong (CN)

(72) Inventors: Chaojun Li, Beijing (CN); Yan Cheng, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 136 days.

(21) Appl. No.: 16/786,646

(22) Filed: Feb. 10, 2020

(65) Prior Publication Data

US 2020/0178232 A1   Jun. 4, 2020

Related U.S. Application Data

(63) Continuation of application No. PCT/CN2017/107869, filed on Oct. 26, 2017.

(30) Foreign Application Priority Data

Aug. 10, 2017   (WO) ............... PCT/CN2017/096905

(51) Int. Cl.
  *H04W 72/04*   (2009.01)
  *H04L 5/00*   (2006.01)
(52) U.S. Cl.
  CPC ......... *H04W 72/042* (2013.01); *H04L 5/0007* (2013.01); *H04W 72/044* (2013.01)
(58) Field of Classification Search
  CPC .................................................. H04W 72/042
  See application file for complete search history.

(56) References Cited

U.S. PATENT DOCUMENTS

| | | | |
|---|---|---|---|
| 2017/0135127 A1 | 5/2017 | Nogami et al. | |
| 2020/0068591 A1* | 2/2020 | Xu | ........................... H04L 5/003 |
| 2020/0214014 A1* | 7/2020 | Wang | ................ H04W 72/0493 |

FOREIGN PATENT DOCUMENTS

| | | |
|---|---|---|
| CN | 102420685 A | 4/2012 |
| CN | 102711253 A | 10/2012 |
| CN | 102869049 A | 1/2013 |
| CN | 103580834 A | 2/2014 |
| CN | 103582135 A | 2/2014 |

(Continued)

OTHER PUBLICATIONS

Huawei et al., "PDCCH-to-CCE mapping," 3GPP TSG RAN WG1 Meeting #89, R1-1706947, Hangzhou, China, May 15-19, 2017, 3 pages.

(Continued)

*Primary Examiner* — John D Blanton
(74) *Attorney, Agent, or Firm* — Fish & Richardson P.C.

(57) ABSTRACT

Example communication methods and apparatus are described. One example method includes receiving configuration information of a first control resource set by a terminal device, where the configuration information of the first control resource set includes mapping manner information of the first control resource set. The terminal device determines a mapping manner between a control channel element (CCE) and resource element groups (REGs) in the first control resource set based on the mapping manner information of the first control resource set, wherein a REG in the first control resource set occupies one symbol in time domain and occupies one resource block RB in frequency domain.

20 Claims, 23 Drawing Sheets

(56) References Cited

FOREIGN PATENT DOCUMENTS

| CN | 103944692 A | 7/2014 |
|----|-------------|--------|
| CN | 104769871 A | 7/2015 |
| CN | 106160923 A | 11/2016 |
| WO | 2011038645 A1 | 4/2011 |

OTHER PUBLICATIONS

Office Action issued in Chinese Application No. 201780046650.1 dated Sep. 3, 2020, 19 pages (with English translation).
3GPP TS 36.211 V14.3.0 (Jun. 2017), "3rd Generation Partnership Project; Technical Specification Group Radio Access Network; Evolved Universal Terrestrial Radio Access (E-UTRA); Physical channels and modulation (Release 14)," Jun. 2017, 196 pages.
3GPP TS 36.213 V14.3.0 (Jun. 2017), "3rd Generation Partnership Project; Technical Specification Group Radio Access Network; Evolved Universal Terrestrial Radio Access (E-UTRA); Physical layer procedures (Release 14)," Jun. 2017, 460 pages.
Extended European Search Report issued in 179921211.3 dated Jun. 23, 2020, 9 pages.
HTC, "Design of resource mapping and NR-PDCCH," 3GPP TSG RAN WG1 NR ad-Hoc #2, R1-1711273, Qingdao, P. R. China, Jun. 27-30, 2017, 4 pages.
Huawei, HiSilicon, "CCE-to-REG Mapping," 3GPP TSG RAN WG1 Meeting #89, R1-1706946, Hangzhou, China, May 15-19, 2017, 7 pages.
LG Electronics, "Design aspects on sPDCCH," 3GPP TSG RAN WG1 Meeting #89, R1-1707543, Hangzhou, P.R. China, May 15-19, 2017, 6 pages.
Office Action issued in Chinese Application No. 201780046650.1 dated Mar. 4, 2020, 19 pages (with English translation).
Panasonic, "The relation among RS, REG, CCE, and CORESET," 3GPP TSG RAN WG1 Meeting #89, R1-1708108, May 15-19, 2017, 5 pages.
PCT International Search Report and Written Opinion issued in International Application No. PCT/CN2017/096905 dated Apr. 28, 2018, 14 pages (with English translation).
PCT International Search Report and Written Opinion issued in International Application No. PCT/CN2017/107869 dated Apr. 27, 2018, 14 pages (with English translation).
Samsung, "CORESET Configurations," 3GPP TSG RAN WG1 NR ad-Hoc #2, R1-1710693, Qingdao, China, Jun. 27-30, 2017, 3 pages.
ZTE, "sPDCCH design for short TTI," 3GPP TSG RAN WG1 Meeting #89, R1-1707276, Hangzhou, P.R. China , May 15-19, 2017, 9 pages.

* cited by examiner

COMMUNICATION METHOD, TERMINAL DEVICE, AND NETWORK DEVICE

CROSS-REFERENCE TO RELATED APPLICATIONS

This application is a continuation of International Application No. PCT/CN2017/107869, filed on Oct. 26, 2017, which claims priority to International Application No. PCT/CN2017/096905, filed on Aug. 10, 2017. The disclosures of the aforementioned applications are hereby incorporated by reference in their entireties.

TECHNICAL FIELD

This application relates to the communications field, and more specifically, to a communication method, a terminal device, and a network device.

BACKGROUND

A physical downlink control channel (Physical Downlink Control Channel, PDCCH) carries downlink control information (Downlink Control Information, DCI). The DCI may include resource allocation information and other control information of one or more terminal devices. Generally, a plurality of PDCCHs may be transmitted in one subframe. A terminal device needs to first obtain DCI from a PDCCH of the terminal device through demodulation, so that a physical downlink shared channel (Physical Downlink Shared Channel, PDSCH) that belongs to the terminal device, such as a broadcast message, paging, and data, can be demodulated from a corresponding resource location.

In a Long Term Evolution (Long Term Evolution, LTE) system, to configure a PDCCH more efficiently, two dedicated control channel resource units are defined: a resource element group (Resource Element Group, REG) and a control channel element (Control Channel Element, CCE). The PDCCH is transmitted in one or more consecutive CCEs. Each CCE includes nine REGs, and each REG includes four or six neighboring resource elements (Resource Element, RE) located in a same OFDM symbol.

Before the PDCCH is transmitted, a network device needs to first determine a CCE transmitting the PDCCH, and finally determines a mapping relationship between the PDCCH and an RE based on a mapping relationship between the CCE and an REG and the RE included in the REG. However, because the REG defined in the prior art includes four or six REs in terms of granularity, and the granularity of the REs in the REG is relatively small, if a relatively large quantity of resources are required for transmitting the PDCCH, a plurality of CCEs need to be determined, and REGs in each of the plurality of CCEs needs to be determined. In this case, a delay generated when the mapping relationship between the CCE transmitting the PDCCH and the REG is determined is increased.

SUMMARY

This application provides a communication method, a terminal device, and a network device, so as to reduce a delay generated when a mapping relationship between a CCE transmitting a PDCCH and an REG is determined.

According to a first aspect, a communication method is provided, including:

receiving, by a terminal device, configuration information of a first control resource set, where the configuration information of the first control resource set includes mapping manner information of the first control resource set; and determining, by the terminal device, based on the mapping manner information of the first control resource set a mapping manner between a control channel element CCE and resource element groups REGs in the first control resource set, where a REG in the first control resource set occupies one symbol in time domain and occupies one resource block RB in frequency domain.

In the communication method according to this embodiment of this application, the CCE-to-REG mapping manner is determined based on a granularity greater than a granularity of REs in an REG defined in the prior art. This helps reduce a delay generated when a mapping relationship between a CCE transmitting a PDCCH and an REG is determined.

With reference to the first aspect, in a possible implementation of the first aspect, a mapping manner of CCEs in the first control resource set is localized mapping, a plurality of REGs included in each of the CCEs in the first control resource set are consecutive in frequency domain, and the plurality of REGs included in each CCE are located in a same symbol.

With reference to the first aspect, in a possible implementation of the first aspect, the CCEs in the first control resource set are numbered sequentially, the CCEs in the first control resource set are first numbered consecutively in time domain, and adjacently numbered CCEs in the first control resource set are located in different symbols.

With reference to the first aspect, in a possible implementation of the first aspect, the mapping manner information of the first control resource set indicates that the mapping manner of the first control resource set is localized mapping, and each CCE in the first control resource set includes a plurality of REGs consecutive in frequency domain, and the plurality of REGs included in each CCE are located in a same symbol.

With reference to the first aspect, in a possible implementation of the first aspect, REGs in a CCE numbered n in the first control resource set is numbered $$m \cdot N_{symb}^{CORESET} + n \bmod N_{symb}^{CORESET} + \left\lfloor \frac{n}{N_{symb}^{CORESET}} \right\rfloor \cdot N_{REG}^{CCE} \cdot N_{symb}^{CORESET},$$

or

REGs in a CCE numbered n in the first control resource set is numbered $$m + (n \bmod N_{symb}^{CORESET}) \cdot N_{RB}^{CORESET} + \left\lfloor \frac{n}{N_{symb}^{CORESET}} \right\rfloor \cdot N_{REG}^{CCE},$$

or a CCE numbered n in the first control resource set contains REGs numbered $$m + \left\lfloor \frac{n}{N_{symb}^{CORESET}} \right\rfloor \cdot N_{REG}^{CCE}$$

and located in a symbol numbered n mod $N_{symb}^{CORESET}$.

where m=0, 1 . . . , $N_{REG}^{CCE}$−1, n=0, 1, . . . , $N_{CCE}^{CORESET}$−1, $N_{symb}^{CORESET}$ is a quantity of symbols included in the first control resource set, $N_{REG}^{CCE}$ is a quantity of REGs included in the CCE numbered n in the first control resource set, and $N_{CCE}^{CORESET}$ is a quantity of CCEs included in the first control resource set.

With reference to the first aspect, in a possible implementation of the first aspect, the mapping manner information of the first control resource set indicates that the mapping manner of the first control resource set is distributed mapping, and REGs in a CCE numbered n in the first control resource set is numbered $$n\bmod\left\lfloor\frac{N_{RB}^{X_p}}{N_{REG}^{CCE}}\right\rfloor+\left\lfloor\frac{n}{\left\lfloor\frac{N_{RB}^{X_p}}{N_{REG}^{CCE}}\right\rfloor}\right\rfloor\cdot N_{RB}^{X_p}+m\cdot\left\lfloor\frac{N_{RB}^{X_p}}{N_{REG}^{CCE}}\right\rfloor,$$

where n=0, 1, . . . , $N_{CCE}^{X_p}-1$, m=0, 1 . . . , $N_{REG}^{CCE}-1$, $N_{REG}^{CCE}$ is a quantity of REGs included in the CCE numbered n in the first control resource set, $N_{CCE}^{X_p}$ is a quantity of CCEs included in the first control resource set, and $N_{RB}^{X_p}$ is a quantity of resource blocks included in the first control resource set.

With reference to the first aspect, in a possible implementation of the first aspect, the CCEs in the first control resource set are numbered sequentially, the CCEs in the first control resource set are first numbered consecutively in frequency domain, and the CCEs in the first control resource set are numbered in a same order in each symbol.

With reference to the first aspect, in a possible implementation of the first aspect, the mapping manner information of the first control resource set indicates that the mapping manner of the first control resource set is time-first localized mapping, REGs in the first control resource set are numbered in a time-first manner, and REGs in a CCE numbered n in the first control resource set is numbered $m+nN_{REG}^{CCE}$, where m=0, 1, . . . , $N_{REG}^{CCE}-1$, n=0, 1, . . . , $N_{CCE}^{CORESET}-1$, $N_{REG}^{CCE}$ is a quantity of REGs included in the CCE numbered n in the first control resource set, and $N_{CCE}^{CORESET}$ is a quantity of CCEs included in the first control resource set.

With reference to the first aspect, in a possible implementation of the first aspect, a mapping manner of CCEs in the first control resource set is localized mapping, a plurality of REGs included in each of the CCEs in the first control resource set are first consecutive in time domain, and adjacently numbered REGs in each CCE are located in different symbols.

With reference to the first aspect, in a possible implementation of the first aspect, the mapping manner information of the first control resource set indicates that the mapping manner of the first control resource set is frequency-first localized mapping, REGs in the first control resource set are numbered in a frequency-first manner, and REGs in a CCE numbered n in the first control resource set is numbered $m+nN_{REG}^{CCE}$, where m=0, 1, . . . , $N_{REG}^{CCE}-1$, n=0, 1, . . . , $N_{CCE}^{CORESET}-1$, $N_{REG}^{CCE}$ is a quantity of REGs included in the CCE numbered n in the first control resource set, and $N_{CCE}^{CORESET}$ is a quantity of CCEs included in the first control resource set.

With reference to the first aspect, in a possible implementation of the first aspect, a mapping manner of CCEs in the first control resource set is distributed mapping, each of the CCEs in the first control resource set includes a plurality of REG sets, the plurality of REG sets are distributed discretely in frequency domain, and the REGs in the plurality of REG sets are consecutive in time domain.

With reference to the first aspect, in a possible implementation of the first aspect, the mapping manner information of the first control resource set indicates that the mapping manner of the first control resource set is time-first distributed mapping, REGs in the first control resource set are numbered in a time-first manner, and REGs in a CCE numbered n in the first control resource set is numbered $$l+n\cdot N_{symb}^{CORESET}+j\cdot\left\lfloor\frac{N_{REG}^{CORESET}}{\left(\frac{N_{REG}^{CCE}}{N_{symb}^{CORESET}}\right)}\right\rfloor,$$

where l=0, 1, . . . , $N_{symb}^{CORESET}-1$, n=0, 1, . . . , $N_{CCE}^{CORESET}-1$, $$j=0,1,\ldots,\frac{N_{REG}^{CCE}}{N_{symb}^{CORESET}}-1, N_{symb}^{CORESET}$$

is a quantity of symbols included in the first control resource set, $N_{REG}^{CORESET}$ is a quantity of REGs included in the first control resource set, $N_{REG}^{CCE}$ is a quantity of REGs included in the CCE numbered n in the first control resource set, and $N_{CCE}^{CORESET}$ is a quantity of CCEs included in the first control resource set.

With reference to the first aspect, in a possible implementation of the first aspect, REGs in a CCE numbered n in the first control resource set is numbered $$N_{symb}^{CORESET}\cdot\left(n\bmod\left(\frac{N_{CCE}^{CORESET}}{N_{symb}^{CORESET}}\right)\right)+\left\lfloor\frac{n}{\left(\frac{N_{CCE}^{CORESET}}{N_{symb}^{CORESET}}\right)}\right\rfloor+m\cdot\left\lfloor\frac{N_{REG}^{CORESET}}{N_{REG}^{CCE}}\right\rfloor,$$

REGs in a CCE numbered n in the first control resource set is numbered $$n\bmod\left(\frac{N_{CCE}^{CORESET}}{N_{symb}^{CORESET}}\right)+\left\lfloor\frac{n}{\left(\frac{N_{CCE}^{CORESET}}{N_{symb}^{CORESET}}\right)}\right\rfloor\cdot N_{RB}^{CORESET}+m\cdot\left\lfloor\frac{N_{RB}^{CORESET}}{N_{REG}^{CCE}}\right\rfloor,$$

or a CCE numbered n in the first control resource set contains REGs numbered $$n\bmod\left(\frac{N_{CCE}^{CORESET}}{N_{symb}^{CORESET}}\right)+m\cdot\left\lfloor\frac{N_{RB}^{CORESET}}{N_{REG}^{CCE}}\right\rfloor$$

and located in a symbol numbered $$\left\lfloor\frac{n}{\left(\frac{N_{CCE}^{CORESET}}{N_{symb}^{CORESET}}\right)}\right\rfloor,$$

where n=0, 1, . . . , $N_{CCE}^{CORESET}-1$, m=0, 1, . . . , $N_{REG}^{CCE}-1$, $N_{symb}^{CORESET}$ is a quantity of symbols included in the first control resource set, $N_{CCE}^{CORESET}$ is a quantity of CCEs included in the first control resource set, $N_{REG}^{CORESET}$ is a quantity of REGs included in the first control resource set, and $N_{REG}^{CCE}$ is a quantity of REGs included in the CCE numbered n in the first control resource set.

With reference to the first aspect, in a possible implementation of the first aspect, the mapping manner information of the first control resource set indicates that the mapping manner of the first control resource set is time-frequency-interleaved distributed mapping, REGs in the first control resource set are numbered in a time-first manner, and REGs in a CCE numbered n in the first control resource set is numbered $$N_{symb}^{CORESET} \cdot \left\lfloor \frac{n}{N_{symb}^{CORESET}} \right\rfloor + (m+n) \bmod N_{symb}^{CORESET} + m \cdot N_{CCE}^{CORESET},$$

REGs in a CCE numbered n in the first control resource set is numbered $$N_{symb}^{CORESET} \cdot \left( n \bmod \left( \frac{N_{CCE}^{CORESET}}{N_{symb}^{CORESET}} \right) \right) +$$

$$\left( \left\lfloor \frac{n}{\left( \frac{N_{CCE}^{CORESET}}{N_{symb}^{CORESET}} \right)} \right\rfloor + m \right) \bmod N_{symb}^{CORESET} + m \cdot \left\lfloor \frac{N_{REG}^{CORESET}}{N_{REG}^{CCE}} \right\rfloor,$$

where n=0, 1, . . . , $N_{CCE}^{CORESET}$−1, m=0, 1, . . . , $N_{REG}^{CCE}$−1, $N_{symb}^{CORESET}$ is a quantity of symbols included in the first control resource set, $N_{CCE}^{CORESET}$ is a quantity of CCEs included in the first control resource set, $N_{REG}^{CORESET}$ is a quantity of REGs included in the first control resource set, and $N_{REG}^{CCE}$ is a quantity of REGs included in the CCE numbered n in the first control resource set.

With reference to the first aspect, in a possible implementation of the first aspect, a first search space is located in the first control resource set, the first search space includes $M_{p,k}^{(L)}$ physical downlink control channel PDCCH candidates with an aggregation level L, and a PDCCH candidate numbered m is one of the $M_{p,k}^{(L)}$ PDCCH candidates with the aggregation level L; and the method further includes:

determining, by the terminal device based on the mapping manner information of the first control resource set, L CCEs included in the PDCCH candidate numbered m in the first search space.

With reference to the first aspect, in a possible implementation of the first aspect, the mapping manner information of the first control resource set indicates that the mapping manner of the first control resource set is distributed mapping, and if L is equal to 2, the PDCCH candidate numbered m includes two consecutively numbered CCEs; or if L is greater than 2, the PDCCH candidate numbered m includes L CCEs, and at least two of the L CCEs are numbered non-consecutively.

According to a second aspect, this application provides a communication method, including:

determining, by a network device, a mapping manner between a control channel element CCE in a first control resource set and resource element groups REGs in the first control resource set, where a REG in the first control resource set occupies one symbol in time domain and occupies one resource block RB in frequency domain; and sending, by the network device, configuration information of the first control resource set, where the configuration information of the first control resource set includes mapping manner information of the first control resource set, and the mapping manner information of the first control resource set indicates the mapping manner between the CCE and the REGs in the first control resource set.

In the communication method according to this embodiment of this application, the CCE-to-REG mapping manner is determined based on a granularity greater than a granularity of REs in an REG defined in the prior art. This helps reduce a delay generated when a mapping relationship between a CCE transmitting a PDCCH and an REG is determined.

With reference to the second aspect, in a possible implementation of the second aspect, the mapping manner information of the first control resource set indicates that the mapping manner of the first control resource set is localized mapping, each CCE in the first control resource set includes a plurality of REGs consecutive in frequency domain, and the plurality of REGs included in each CCE are located in a same symbol.

With reference to the second aspect, in a possible implementation of the second aspect, REGs in a CCE numbered n in the first control resource set is numbered $$m \cdot N_{symb}^{CORESET} + n \bmod N_{symb}^{CORESET} + \left\lfloor \frac{n}{N_{symb}^{CORESET}} \right\rfloor \cdot N_{REG}^{CCE} \cdot N_{symb}^{CORESET},$$

or

REGs in a CCE numbered n in the first control resource set is numbered $$m + (n \bmod N_{symb}^{CORESET}) \cdot N_{RB}^{CORESET} + \left\lfloor \frac{n}{N_{symb}^{CORESET}} \right\rfloor \cdot N_{REG}^{CCE},$$

or a CCE numbered n in the first control resource set contains REGs numbered $$m + \left\lfloor \frac{n}{N_{symb}^{CORESET}} \right\rfloor \cdot N_{REG}^{CCE}$$

and located in a symbol numbered n mod $N_{symb}^{CORESET}$, where m=0, 1, . . . , $N_{REG}^{CCE}$−1, n=0, 1, . . . , $N_{CCE}^{CORESET}$−1, $N_{symb}^{CORESET}$ is a quantity of symbols included in the first control resource set, $N_{REG}^{CCE}$ is a quantity of REGs included in the CCE numbered n in the first control resource set, and $N_{CCE}^{CORESET}$ is a quantity of CCEs included in the first control resource set.

With reference to the second aspect, in a possible implementation of the second aspect, the mapping manner information of the first control resource set indicates that the mapping manner of the first control resource set is time-first localized mapping, REGs in the first control resource set are numbered in a time-first-frequency-second manner, and REGs in a CCE numbered n in the first control resource set is numbered m+n$N_{REG}^{CCE}$, where m=0, 1, . . . , $N_{REG}^{CCE}$−1, n=0, 1, . . . , $N_{CCE}^{CORESET}$−1, $N_{REG}^{CCE}$ is a quantity of REGs included in the CCE numbered n in the first control resource set, and $N_{CCE}^{CORESET}$ is a quantity of CCEs included in the first control resource set.

With reference to the second aspect, in a possible implementation of the second aspect, the mapping manner information of the first control resource set indicates that the mapping manner of the first control resource set is frequency-first localized mapping, REGs in the first control resource set are numbered in a frequency-first-time-second manner, and REGs in a CCE numbered n in the first control resource set is numbered $m+nN_{REG}^{CCE}$, where m=0, 1, ..., $N_{REG}^{CCE}-1$, n=0, 1, ..., $N_{CCE}^{CORESET}-1$, $N_{REG}^{CCE}$ is a quantity of REGs included in the CCE numbered n in the first control resource set, and $N_{CCE}^{CORESET}$ is a quantity of CCEs included in the first control resource set.

With reference to the second aspect, in a possible implementation of the second aspect, the mapping manner information of the first control resource set indicates that the mapping manner of the first control resource set is time-first distributed mapping. REGs in the first control resource set are numbered in a time-first-frequency-second manner, and REGs in a CCE numbered n in the first control resource set is numbered $$l + n \cdot N_{symb}^{CORESET} + j \cdot \left\lfloor \frac{N_{REG}^{CORESET}}{\frac{N_{REG}^{CCE}}{N_{symb}^{CORESET}}} \right\rfloor,$$

where l=0, 1, ..., $N_{symb}^{CORESET}-1$, n=0, 1, ..., $N_{CCE}^{CORESET}-1$, $$j = 0, 1, \ldots, \frac{N_{REG}^{CCE}}{N_{symb}^{CORESET}} - 1,$$

$N_{symb}^{CORESET}$ is a quantity of symbols included in the first control resource set, $N_{REG}^{CORESET}$ is a quantity of REGs included in the first control resource set, $N_{REG}^{CCE}$ is a quantity of REGs included in the CCE numbered n in the first control resource set, and $N_{CCE}^{CORESET}$ is a quantity of CCEs included in the first control resource set.

With reference to the second aspect, in a possible implementation of the second aspect, REGs in a CCE numbered n in the first control resource set is numbered $$N_{symb}^{CORESET} \cdot \left( n \bmod \left( \frac{N_{CCE}^{CORESET}}{N_{symb}^{CORESET}} \right) \right) + \left\lfloor \frac{n}{\left( \frac{N_{CCE}^{CORESET}}{N_{symb}^{CORESET}} \right)} \right\rfloor + m \cdot \left\lfloor \frac{N_{REG}^{CORESET}}{N_{REG}^{CCE}} \right\rfloor,$$

or

REGs in a CCE numbered n in the first control resource set is numbered $$n \bmod \left( \frac{N_{CCE}^{CORESET}}{N_{symb}^{CORESET}} \right) + \left\lfloor \frac{n}{\left( \frac{N_{CCE}^{CORESET}}{N_{symb}^{CORESET}} \right)} \right\rfloor \cdot N_{RB}^{CORESET} + m \cdot \left\lfloor \frac{N_{RB}^{CORESET}}{N_{REG}^{CCE}} \right\rfloor,$$

or a CCE numbered n in the first control resource set contains REGs numbered $$n \bmod \left( \frac{N_{CCE}^{CORESET}}{N_{symb}^{CORESET}} \right) + m \cdot \left\lfloor \frac{N_{RB}^{CORESET}}{N_{REG}^{CCE}} \right\rfloor$$

and located in a symbol numbered $$\left\lfloor \frac{n}{\left( \frac{N_{CCE}^{CORESET}}{N_{symb}^{CORESET}} \right)} \right\rfloor,$$

where n=0, 1, ..., $N_{CCE}^{CORESET}-1$, m=0, 1, ..., $N_{REG}^{CCE}-1$, $N_{symb}^{CORESET}$ is a quantity of symbols included in the first control resource set, $N_{CCE}^{CORESET}$ is a quantity of CCEs included in the first control resource set, $N_{REG}^{CORESET}$ is a quantity of REGs included in the first control resource set, and $N_{REG}^{CCE}$ is a quantity of REGs included in the CCE numbered n in the first control resource set.

With reference to the second aspect, in a possible implementation of the second aspect, the mapping manner information of the first control resource set indicates that the mapping manner of the first control resource set is time-frequency-interleaved distributed mapping. REGs in the first control resource set are numbered in a time-first manner, and REGs in a CCE numbered n in the first control resource set is numbered $$N_{symb}^{CORESET} \cdot \left\lfloor \frac{n}{N_{symb}^{CORESET}} \right\rfloor + (m+n) \bmod N_{symb}^{CORESET} + m \cdot \left\lfloor \frac{N_{REG}^{CORESET}}{N_{REG}^{CCE}} \right\rfloor,$$

or

REGs in a CCE numbered n in the first control resource set is numbered $$N_{symb}^{CORESET} \cdot \left( n \bmod \left( \frac{N_{CCE}^{CORESET}}{N_{symb}^{CORESET}} \right) \right) + \left( \left\lfloor \frac{n}{\left( \frac{N_{CCE}^{CORESET}}{N_{symb}^{CORESET}} \right)} \right\rfloor + m \right) \bmod N_{symb}^{CORESET} + m \cdot \left\lfloor \frac{N_{REG}^{CORESET}}{N_{REG}^{CCE}} \right\rfloor,$$

where n=0, 1, ..., $N_{CCE}^{CORESET}-1$, m=0, 1, ..., $N_{REG}^{CCE}-1$, $N_{symb}^{CORESET}$ is a quantity of symbols included in the first control resource set, $N_{CCE}^{CORESET}$ is a quantity of CCEs included in the first control resource set, $N_{REG}^{CORESET}$ is a quantity of REGs included in the first control resource set, and $N_{REG}^{CCE}$ is a quantity of REGs included in the CCE numbered n in the first control resource set.

With reference to the second aspect, in a possible implementation of the second aspect, a first search space is located in the first control resource set, the first search space includes $M_{p,k}^{(L)}$ PDCCH candidates with an aggregation level L, a PDCCH candidate numbered m is one of the $M_{p,k}^{(L)}$ PDCCH candidates with the aggregation level L, and the mapping manner information of the first control resource set indicates L CCEs included in the PDCCH candidate numbered m in the first search space.

With reference to the second aspect, in a possible implementation of the second aspect, the mapping manner information of the first control resource set indicates that the mapping manner of the first control resource set is distributed mapping, and if L is equal to 2, the PDCCH candidate numbered m includes two consecutively numbered CCEs; or if L is greater than 2, the PDCCH candidate numbered m includes L CCEs, and at least two of the L CCEs are numbered non-consecutively.

According to a third aspect, a terminal device is provided. The terminal device can implement functions of the terminal device in the foregoing method design in the first aspect. The functions may be implemented by hardware, or may be implemented by hardware executing corresponding software. The hardware or the software includes one or more units corresponding to the foregoing functions.

According to a fourth aspect, a network device is provided. The network device can implement functions of the network device in the foregoing method design in the second aspect. The functions may be implemented by hardware, or may be implemented by hardware executing corresponding software. The hardware or the software includes one or more units corresponding to the foregoing functions.

According to a fifth aspect, a terminal device is provided, including a transceiver, a processor, and a memory. The processor is configured to control the transceiver to send and receive signals. The memory is configured to store a computer program. The processor is configured to invoke the computer program from the memory and run the computer program, so that the terminal device performs the foregoing method in the first aspect.

According to a sixth aspect, a network device is provided, including a transceiver, a processor, and a memory. The processor is configured to control the transceiver to send and receive signals. The memory is configured to store a computer program. The processor is configured to invoke the computer program from the memory and run the computer program, so that the network device performs the foregoing method in the second aspect.

According to a seventh aspect, a communications apparatus is provided. The communications apparatus may be the terminal device in the foregoing method design or a chip disposed in the terminal device. The communications apparatus includes: a memory configured to store computer executable program code, a communications interface, and a processor coupled with the memory and the communications interface. The program code stored in the memory includes an instruction. When the processor executes the instruction, the communications apparatus performs the method performed by the terminal device in any one of the first aspect or the possible designs of the first aspect.

According to an eighth aspect, a communications apparatus is provided. The communications apparatus may be the network device in the foregoing method design or a chip disposed in the network device. The communications apparatus includes: a memory configured to store computer executable program code, a communications interface, and a processor coupled with the memory and the communications interface. The program code stored in the memory includes an instruction. When the processor executes the instruction, the communications apparatus performs the method performed by the network device in any one of the second aspect or the possible designs of the second aspect.

According to a ninth aspect, a computer program product is provided. The computer program product includes computer program code. When the computer program code is executed on a computer, the computer performs the methods in the foregoing aspects.

According to a tenth aspect, a computer readable medium is provided. The computer readable medium stores program code. When the program code is executed on a computer, the computer performs the methods in the foregoing aspects.

According to an eleventh aspect, a chip is provided, including a processor and a memory. The memory is configured to store a computer program. The processor is configured to invoke the computer program from the memory and run the computer program. The computer program is used to implement the methods in the foregoing aspects.

BRIEF DESCRIPTION OF DRAWINGS

FIG. 9 is a schematic diagram of a mapping manner 1 established based on an REG numbering method 3 according to an embodiment of this application:

FIG. 11 is a schematic diagram of a mapping manner 3 established based on an REG numbering method 1 according to an embodiment of this application;

DESCRIPTION OF EMBODIMENTS

The following describes technical solutions of this application with reference to accompanying drawings.

Figure 1:
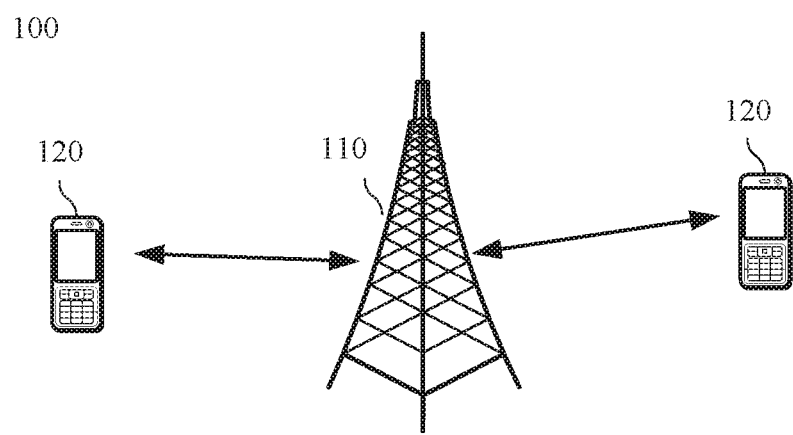
FIG. 1 is a wireless communications system 100 to which an embodiment of this application applies.

FIG. 1 is a wireless communications system 100 to which an embodiment of this application applies. The wireless communications system 100 may include a network device 110. The network device 110 may be a device communicating with a terminal device. The network device 110 may provide communication coverage for a specific geographical area, and may communicate with a terminal device located in the coverage area.

FIG. 1 shows an example in which there are one network device and two terminals. Optionally, the wireless communications system 100 may include a plurality of network devices, and another quantity of terminals may be included in a coverage area of each network device. This is not limited in this embodiment of this application.

Optionally, the wireless communications system 100 may further include other network entities such as a network controller and a mobility management entity. This is not limited in this embodiment of this application.

It should be understood that the technical solutions of this application may be applied to various communications systems, such as a Global System for Mobile Communications (Global System for Mobile Communications, GSM), a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS), a Long Term Evolution (Long Term Evolution, LTE) system, a Long Term Evolution Advanced (long term evolution advanced, LTE-A) system, a Universal Mobile Telecommunications System (Universal Mobile Telecommunication System, UMTS), a new radio (New Radio, NR) access technology, and a 5G system.

It should be further understood that, in the embodiments of this application, the terminal device may include but is not limited to a mobile station (Mobile Station, MS), a mobile terminal (Mobile Terminal), a mobile telephone (Mobile Telephone), user equipment (User Equipment, UE), a handset (handset), portable equipment (portable equipment), and the like. The terminal device may communicate with one or more core networks by using a radio access network (Radio Access Network, RAN). For example, the terminal device may be a mobile phone (or referred to as a "cellular" phone), a computer having a wireless communication function, or the like; or the terminal device may be a portable, pocket-sized, handheld, computer built-in, or in-vehicle mobile apparatus.

In the embodiments of this application, the network device may be an access network device, for example, may be a base station, a transmit and receive point (Transmit and Receive Point, TRP), or an access point. The base station may be a base transceiver station (Base Transceiver Station, BTS) in the GSM or CDMA system, may be a NodeB (NodeB) in the WCDMA system, may be an evolved NodeB (evolved Node B, eNB, e-NodeB) in the LTE system, or may be a gNodeB (gNB) in the NR or 5G system. This is not specifically limited in the embodiments of this application.

For ease of understanding, concepts related to the embodiments of this application are first described briefly.

1. Resource element (resource element, RE): A smallest resource unit. The resource element may correspond to one symbol in time domain and may correspond to one subcarrier in frequency domain. The resource element may be uniquely identified by an index pair (k, l), where k is a subcarrier index, and l is a symbol index.

2. Resource block (resource block, RB): One RB occupies $N_{sc}^{RB}$ consecutive subcarriers in frequency domain, where $N_{sc}^{RB}$ is a positive integer, and $N_{sc}^{RB}$ is equal to 12. In the embodiments of this application, the RB may be defined merely from the perspective of a frequency domain resource. In other words, a quantity of time domain resources occupied by the RB in time domain is not limited.

3. Symbol (symbol): The embodiments of this application do not limit a time length of a symbol. A length of a symbol may vary according to different subcarrier spacings. Symbols may include an uplink symbol and a downlink symbol. The uplink symbol may be referred to as a single carrier frequency division multiple access (Single Carrier-Frequency Division Multiple Access. SC-FDMA) symbol or an orthogonal frequency division multiplexing (Orthogonal Frequency Division Multiplexing, OFDM) symbol. The downlink symbol may be referred to as an OFDM symbol.

It should be noted that the symbol may also be corresponding to other uplink multiple access manners or downlink multiple access manners. This is not specifically limited in the embodiments of this application.

4. Transmission duration (Transmission Duration): One transmission duration includes N symbols, where N is a positive integer. The embodiments of this application do not limit a time length of a transmission duration, that is, do not limit a value of N. For example, one transmission duration may be one subframe (subframe), one slot (slot), one mini-slot (mini-slot), or one short transmission duration (short Transmission Duration, STD) (also referred to as a short transmission time interval (short Transmission Time Interval, STTI). In an existing LTE system, one slot includes seven or six symbols, and one subframe includes two slots.

In the NR system, a quantity of symbols included in one slot may be determined based on a type of a cyclic prefix (Cyclic prefix, CP) and a value of μ. When μ is equal to 0, 1, 2, 3, 4, or 5 and the cyclic prefix is a normal CP (Normal cyclic prefix, normal CP), one slot may include 7 or 14 symbols. When μ is equal to 2 and the cyclic prefix is an extended CP (Extended cyclic prefix, extended CP), one slot may include 12 or 6 symbols. If one slot includes 14 symbols, one subframe may include $2^\mu$ slots, where μ is equal to 0, 1, 2, 3, 4, or 5. For example, if μ is equal to 0, one subframe includes 14 symbols; if one slot includes 7 or 6 symbols, one subframe may include $2^{\mu+1}$ slots, where $\mu$ is equal to 0, 1, or 2. For example, if $\mu$ is equal to 0, one subframe includes two slots, that is, 14 symbols. A quantity of symbols included in one mini-slot (mini-slot) is less than a quantity of symbols included in one slot. A quantity of symbols included in one STD or one sTTI is less than or equal to 7, for example, 2, 3, or 7.

5. Downlink control channel: A channel used to carry downlink control information. The downlink control channel in the embodiments of this application may be an sPDCCH, an NR-PDCCH, or another channel whose functions are similar to those of the downlink control channel and that are newly defined in a future communications protocol. The sPDCCH (short PDCCH, or shortened PDCCH) indicates a downlink control channel occupying a time domain resource that is less than or equal to 0.5 ms. The NR-PDCCH (new radio PDCCH) indicates a downlink control channel defined in the NR system. The embodiments of this application do not limit a type or a name of the downlink control channel, and all downlink control channels are collectively referred to as PDCCHs.

Specifically, the PDCCH in the embodiments of this application may alternatively be a cell-specific reference signal (Cell-specific Reference Signal, CRS)-based PDCCH or a demodulation reference signal (Demodulation Reference Signal, DMRS)-based PDCCH. The CRS-based PDCCH may be a PDCCH demodulated based on a CRS, and the DMRS-based PDCCH may be a PDCCH demodulated based on a DMRS. The CRS is a reference signal (Reference Signal, RS) configured by the network device for all terminal devices in a cell. The DMRS is an RS by the network device for a specific terminal device, and may also be referred to as a user equipment-specific reference signal (UE-specific Reference Signal, URS).

It should be noted that a PDCCH defined in the NR system may be the foregoing DMRS-based PDCCH.

6. Aggregation level (Aggregation Level, Ala.): An aggregation level may indicate a quantity of consecutive CCEs occupied by one PDCCH. In other words, one downlink control channel is obtained by aggregating L downlink control channel elements (control channel element, CCE), where L is a positive integer. It may be said that an aggregation level of the PDCCH is L. Specifically, a value of L may be 1, 2, 4, or 8. It should be noted that, to improve reliability of the PDCCH, a value of L may be 16 or 32.

7. Resource element group (REG, Resource-Element Group): Occupies one symbol in time domain and occupies one resource block RB in frequency domain. In other words, a frequency range occupied by one REG in frequency domain is equal to a frequency range occupied by one RB in frequency domain. For example, one REG may include 12 consecutive subcarriers in frequency domain. It should be noted that when the 12 consecutive subcarriers include an RE transmitting a CRS or a DMRS, a quantity of REs that can actually transmit a downlink control channel is less than 12.

8. CCE: One CCE may include $N_{REG}^{CCE}$ REGs, where $N_{REG}^{CCE}$ is a positive integer. For example, a value of $N_{REG}^{CCE}$ may be 3, 4, or 6.

9. Search space: A set of downlink control channel candidates. A search space may be understood as a combination of one or more downlink control channel candidates. Each downlink control channel candidate can be used to carry downlink control information. The terminal device needs to monitor the downlink control channel candidate. Therefore, the search space is a set of downlink control channel candidates monitored by the terminal device.

10. Control resource set (Control-resource Set, CORESET): A set of resources used to transmit downlink control information. The control resource set may also be referred to as a control resource area or a PDCCH resource set.

It should be noted that one or more control resource sets may be configured for one terminal device. Without loss of generality, the following is described by using a first control resource area in at least one control resource set configured for the terminal device as an example. The first control resource set occupies $N_{RB}^{CORESET}$ resource blocks in frequency domain, and the first control resource set includes $N_{symb}^{CORESET}$ symbols in time domain, where $N_{RB}^{CORESET}$ is a positive integer, and $N_{symb}^{CORESET}$ is a positive integer. For example, a value of $N_{symb}^{CORESET}$ may be 1, 2, or 3. The first control resource set includes $N_{REG}^{CORESET}$, where $N_{REG}^{CORESET}$ is a positive integer. The first control resource set includes $N_{CCE}^{CORESET}$ CCEs, where $N_{CCE}^{CORESET}$ is a positive integer, and $N_{CCE}^{CORESET} = \lfloor N_{REG}^{CORESET} / N_{REG}^{CCE} \rfloor$ or $N_{CCE}^{CORESET} = N_{REG}^{CORESET} / N_{REG}^{CCE}$.

11. REG bundle (REG bundle): For a DMRS-based PDCCH, the terminal device may consider that same precoding (precoding) is used in one REG bundle (REG bundle). In other words, joint channel estimation can be performed in one REG bundle. One REG bundle includes $N_{REG}^{REG\text{-}bundle}$, where $N_{REG}^{REG\text{-}bundle}$ is a positive integer. For example, $N_{REG}^{REG\text{-}bundle}$ is equal to 2, 3, or 6. Optionally, one REG bundle includes $N_{REG}^{REG\text{-}bundle}$ consecutively-numbered REGs. One CCE includes $N_{REG\text{-}bundle}^{CCE}$ REG bundles, where $N_{REG\text{-}bundle}^{CCE}$ is a positive integer, and $N_{REG}^{CCE} = N_{REG\text{-}bundle}^{CCE} N_{REG}^{REG\text{-}bundle}$. The first control resource set includes $N_{REG\text{-}bundle}^{CORESET}$ REG bundles, where $N_{REG\text{-}bundle}^{CORESET}$ is a positive integer, and $N_{REG\text{-}bundle}^{CORESET} = \lfloor N_{REG}^{CORESET} / N_{REG}^{REG\text{-}bundle} \rfloor$ or $N_{REG\text{-}bundle}^{CORESET} = N_{REG}^{CORESET} / N_{REG}^{REG\text{-}bundle}$.

It should be noted that the first control resource set may be denoted as a set $X_p$. Correspondingly, "CORESET" in the mathematical expressions may be interchanged with "$X_p$". For example, $N_{RB}^{CORESET}$ is equivalent to $N_{RB}^{X_p}$, $N_{symb}^{CORESET}$ is equivalent to $N_{symb}^{X_p}$, $N_{REG}^{CORESET}$ is equivalent to $N_{REG}^{X_p}$, $N_{CCE}^{CORESET}$ is equivalent to $N_{CCE}^{X_p}$, and $N_{REG\text{-}bundle}^{CORESET}$ is equivalent to $N_{REG\text{-}bundle}^{X_p}$.

The following describes in detail methods for numbering REGs in a control resource set with reference to FIG. 2 to FIG. 5. It should be noted that the following describes the REG numbering methods merely by using an example in which a plurality of REGs included in one control resource set (for example, the first control resource set) occupy two symbols. However, a specific quantity of symbols included in one control resource set is not specifically limited in this application.

Figure 2:
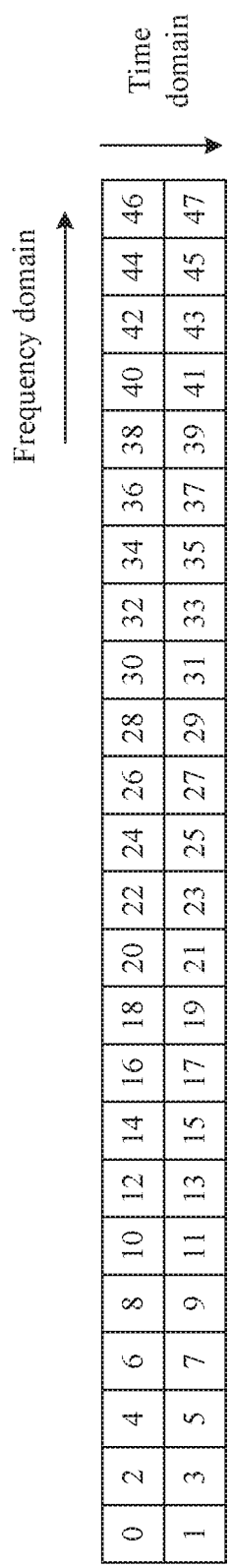
FIG. 2 is a schematic diagram of numbering REGs in a control resource area in a time-first manner according to an embodiment of this application.

REG Numbering Method 1:

Time-first. To be specific, REGs are numbered in time-first ascending order. In other words, the REGs in the first control resource set are numbered in time-first-frequency-second ascending order. In the first control resource set, an REG located in a first symbol in time domain and in an RB with a smallest number in frequency domain is numbered 0, and two adjacent REGs in frequency domain are numbered non-consecutively. Numbers of REGs in each symbol in the first control resource set increase in a same direction as numbers of RBs in the first control resource set, or numbers of REGs in each symbol in the first control resource set increase in a same direction. For example, FIG. 2 is a schematic diagram of numbering REGs in a control resource area in a time-first manner according to an embodiment of this application.

Figure 4:
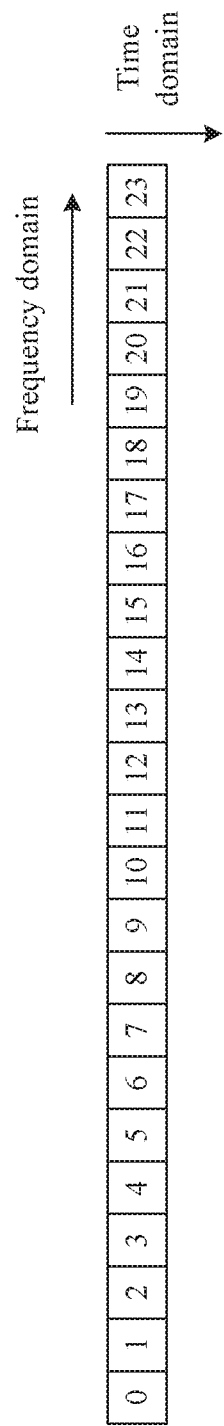
FIG. 4 is a schematic diagram of numbering REGs in a control resource area in a time-first manner according to an embodiment of this application.

In addition, the foregoing time-first REG numbering method may also be applied to a case in which an REG in the first control resource set occupies only one symbol in time domain, that is, $N_{symb}^{CORESET}$ is equal to 1, and REGs in the first control resource set may be numbered in ascending order of RB numbers. For example, FIG. 4 is a schematic diagram of numbering REGs in a control resource area in a time-first manner according to an embodiment of this application.

Figure 3:
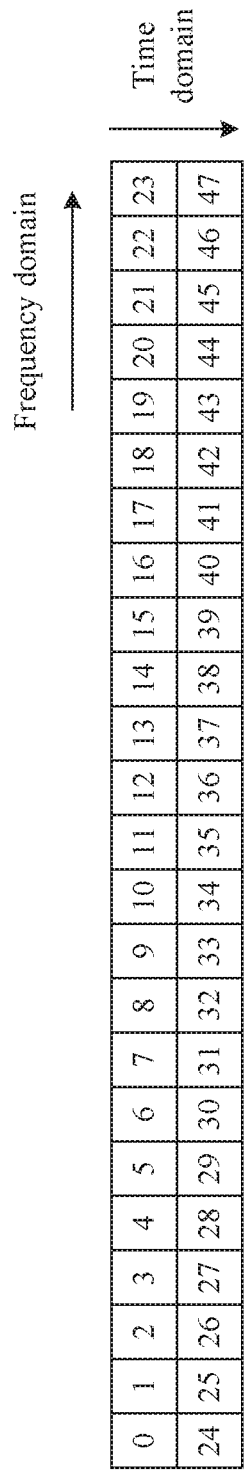
FIG. 3 is a schematic diagram of numbering REGs in a control resource area in a frequency-first manner according to an embodiment of this application.

REG Numbering Method 2:

Frequency-first. That is, REGs are numbered in frequency-first ascending order. To be specific, the REGs in the first control resource set are numbered in frequency-first-time-second ascending order. In the first control resource set, an REG located in a first symbol in time domain and in an RB with a smallest number in frequency domain is numbered 0, and two adjacent REGs in time domain are numbered non-consecutively. For example, FIG. 3 is a schematic diagram of numbering REGs in a control resource area in a frequency-first manner according to an embodiment of this application.

In addition, the foregoing frequency-first REG numbering method may also be applied to a case in which an REG in the first control resource set occupies only one symbol in time domain, that is, $N_{symb}^{CORESET}$ is equal to 1, and REGs in the first control resource set may be numbered in ascending order of RB numbers. In other words, numbers of REGs in the first control resource set increase in a same direction as numbers of RBs in the first control resource set. For example, FIG. 4 is a schematic diagram of numbering REGs in a control resource area in a time-first manner according to an embodiment of this application.

Figure 5:
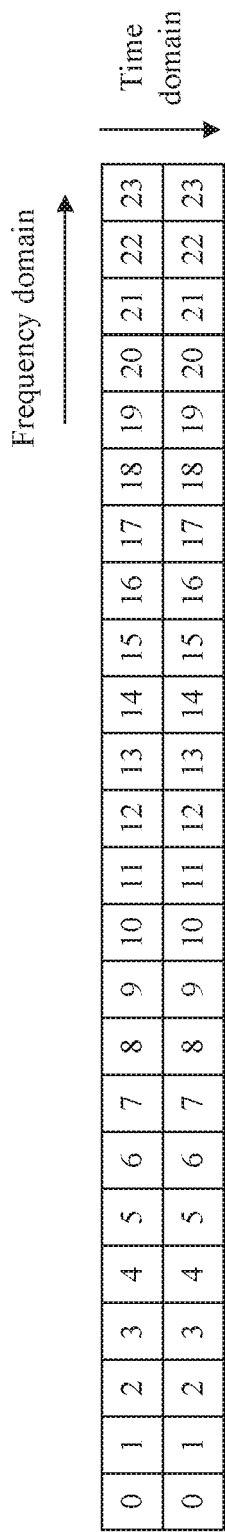
FIG. 5 is a schematic diagram of numbering REGs consecutively only in frequency domain according to an embodiment of this application.

REG Numbering Method 3:

REGs are numbered only in frequency domain. To be specific, REGs in each symbol are numbered in ascending order of RB numbers. In other words, numbers of REGs in the first control resource set increase only in a frequency domain direction, and numbers of REGs that are located in different symbols and that occupy a same frequency are the same, or numbers of REGs that occupy different symbols in time domain and occupy a same RB in frequency domain are the same. For example, FIG. 5 is a schematic diagram of numbering REGs consecutively only in frequency domain according to an embodiment of this application.

In other words, in the REG numbering method 3, if the REG in the first control resource area occupies a plurality of symbols in time domain, two parameters are needed for determining a number of one REG: a number of a symbol in which the REG is located in time domain, and a number of the REG in the symbol.

In addition, the foregoing numbering method 3 may also be applied to a case in which an REG in the first control resource set occupies only one symbol in time domain, that is, $N_{symb}^{CORESET}$ is equal to 1, and REGs in the first control resource set may be numbered in ascending order of RB numbers. For example, FIG. 4 is a schematic diagram of numbering REGs in a control resource area in a time-first manner according to an embodiment of this application.

Figure 6:
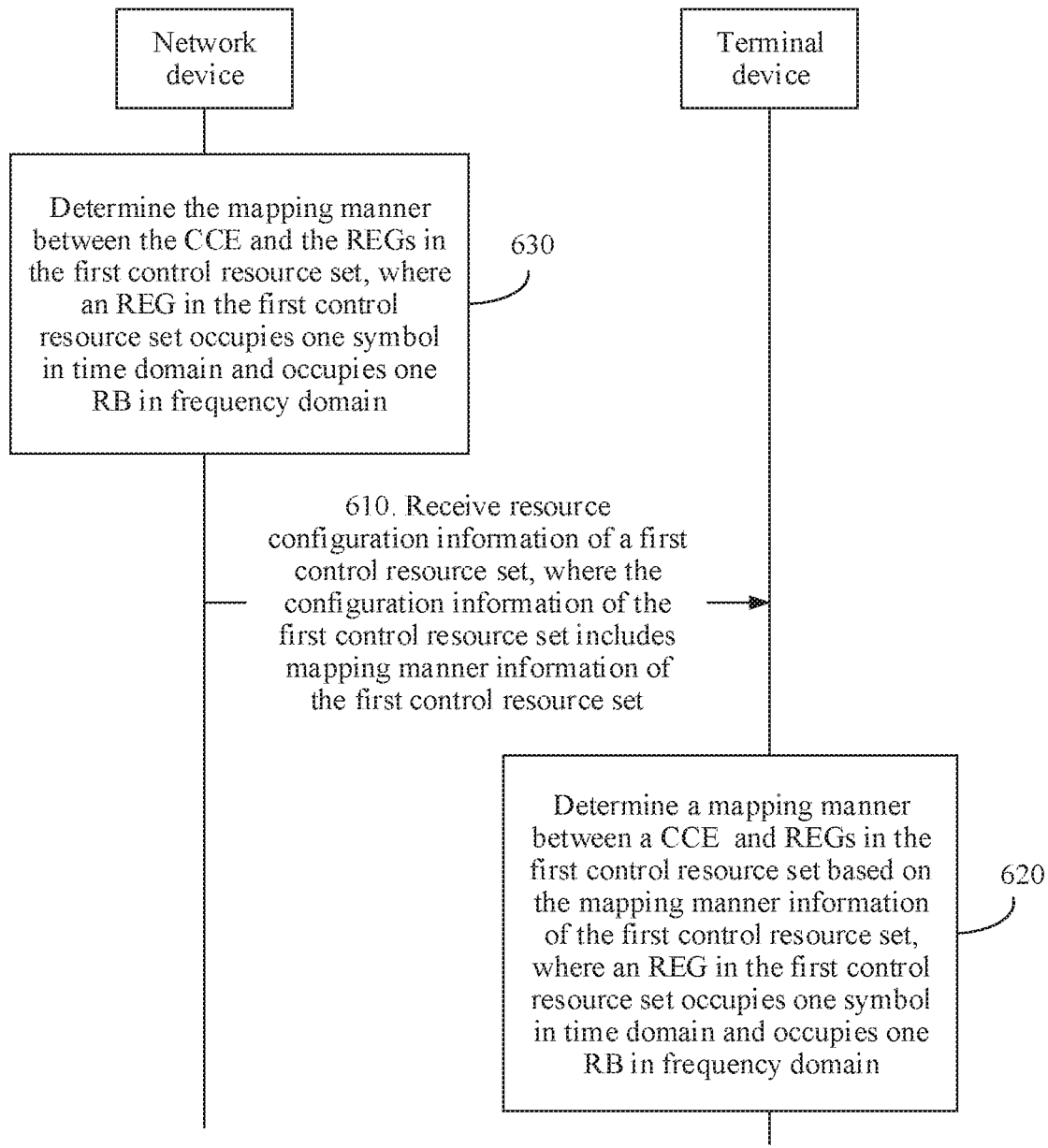
FIG. 6 is a schematic flowchart of a communication method according to an embodiment of this application.

The following describes in detail a communication method in an embodiment of this application with reference to FIG. 6 and the foregoing methods for numbering REGs in the first control resource set.

FIG. 6 is a schematic flowchart of a communication method according to an embodiment of this application. The method shown in FIG. 6 includes the following steps.

610. A terminal device receives configuration information of a first control resource set, where the configuration information of the first control resource set includes mapping manner information of the first control resource set.

Specifically, the mapping manner information of the first control resource set may also be referred to as transmission type (transmission Type) information of the first control resource set. The mapping manner information of the first control resource set may be used to indicate at least one of the following mapping manners: a mapping manner between a CCE and REGs in the first control resource set, a mapping manner between a PDCCH candidate included in a search space in the first control resource set and a CCE in the first control resource set, and a mapping relationship between a search space and a PDCCH candidate in the first control resource set.

Optionally, the mapping manner information indicates a distributed mapping manner or a localized mapping manner, or the transmission type information indicates a distributed transmission type or a localized transmission type. It should be noted that "distributed" (distributed) may also be referred to as "interleaved" (interleaved), and "localized" (localized) may also be referred to as "non-interleaved" (non-interleaved). Therefore, "distributed" mentioned in this embodiment of this application may be interchanged with "interleaved", and "localized" may be interchanged with "non-interleaved".

Optionally, the mapping manner information indicates a time-first distributed mapping manner, a frequency-first distributed mapping manner, a time-first localized mapping manner, or a frequency-first localized mapping manner.

It should be understood that the mapping manner information may directly indicate a mapping manner. For example, the mapping manner information directly indicates that the mapping manner is time-first distributed mapping. Alternatively, the mapping manner information may indicate a mapping manner by using two parts of information. For example, a part of information indicates time-first or frequency-first, and the other part of information indicates a localized mapping manner or a distributed mapping manner.

Optionally, the mapping manner information indicates either a distributed mapping manner or a localized mapping manner.

Optionally, the mapping manner information indicates one of a time-first distributed mapping manner, a frequency-first distributed mapping manner, a time-first localized mapping manner, and a frequency-first localized mapping manner.

Optionally, the mapping manner information is further used to indicate one of the following six mapping manners.

Optionally, a network device sends configuration information of the first control resource set. The configuration information of the first control resource set includes the mapping manner information of the first control resource set, and the mapping manner information of the first control resource set indicates the mapping manner between the CCE and the REGs in the first control resource set.

Specifically, that the network device sends the configuration information of the first control resource set may include that the network device may send the configuration information of the first control resource set to the foregoing terminal device.

It should be noted that alternatively, a sender of the configuration information of the first control resource set may be another terminal device, or may be a network device. This is not specifically limited in this embodiment of this application.

620. The terminal device determines based on the mapping manner information of the first control resource set, a mapping manner between a control channel element CCE and resource element groups REGs in the first control resource set, where a REG in the first control resource set occupies one symbol in time domain and occupies one resource block RB in frequency domain.

In the communication method according to this embodiment of this application, the CCE-to-REG mapping manner is determined based on a granularity greater than a granularity of REs in an REG defined in the prior art. This helps reduce a delay generated when a mapping relationship between a CCE transmitting a PDCCH and an REG is determined.

Optionally, if the foregoing communication method is a communication method between a network device and the terminal device, before step 610, the method further includes:

630. A network device determines the mapping manner between the control channel element CCE and the resource element groups REGs in the first control resource set, where a REG in the first control resource set occupies one symbol in time domain and occupies one resource block RB in frequency domain.

Specifically, the mapping manner between the CCE and the REGs in the first control resource set is localized CCE-to-REG mapping (localized CCE-to-REG mapping), which is also referred to as non-interleaved CCE-to-REG mapping (non-interleaved CCE-to-REG mapping). Alternatively, the mapping manner between the CCE and the REGs in the first control resource set is distributed CCE-to-REG mapping (distributed CCE-to-REG mapping), which is also referred to as interleaved CCE-to-REG mapping (interleaved CCE-to-REG mapping).

It should be understood that the distributed CCE-to-REG mapping may be understood as that a plurality of REGs in each CCE are consecutive in time domain and discretely distributed in frequency domain, or are discretely distributed in frequency domain and occupy only one time domain symbol, or are interleaved and discretely distributed in time domain and frequency domain. All the following mapping manner 4, mapping manner 5, and mapping manner 6 belong to distributed mapping.

The mapping manner between the CCE and the REGs in the first control resource set may be understood as a number of REGs in a CCE numbered n. The following describes in detail the mapping manner between the CCE and the REGs in the first control resource set with reference to FIG. 2 to FIG. 4. It may be understood that the mapping between the CCE and the REG in the first control resource set may be any one of the following mapping manners, or a combination of a plurality of mapping manners in the following mapping manners. A specific combination manner of the following mapping manners is not specifically limited in this embodiment of this application.

Optionally, the mapping manner information of the first control resource set indicates that the mapping manner of the first control resource set is localized mapping, that is, non-interleaved mapping. It should be noted that the mapping manner of the first control resource set is localized mapping may include that the mapping manner between the CCE and the REGs in the first control resource set is localized mapping, and/or the mapping manner between the PDCCH candidate included in the search space in the first control resource set and the CCE in the first control resource set is localized mapping.

It should be noted that the localized CCE-to-REG mapping may be understood as that a plurality of REGs in each CCE are consecutive in time domain and/or frequency domain. For example, the plurality of REGs in each CCE are consecutive in time domain and frequency domain. For example, the plurality of REGs in each CCE occupy a same symbol and are consecutive in frequency domain. All the following mapping manners 1, 2, and 3 belong to localized mapping.

Mapping Manner 1:

Each CCE in the first control resource set includes a plurality of REGs consecutive in frequency domain, and the plurality of REGs included in each CCE are located in a same symbol. When $N_{symb}^{CORESET}$ is equal to 1, CCEs in the first control resource set are numbered in ascending order of RB numbers in frequency domain. When $N_{symb}^{CORESET}$ is greater than 1, CCEs in the first control resource set are numbered in a time-first manner. In other words, CCEs in the first control resource set are first numbered consecutively in time domain. The mapping manner 1 may be referred to as semi-time-first localized mapping or semi-time-first non-interleaved mapping.

It should be noted that the CCEs in the first control resource set are numbered in a time-first manner, and two CCEs that occupy a same symbol and that are adjacent to each other in frequency domain are numbered non-consecutively.

Optionally, the mapping manner information of the first control resource set indicates that the mapping manner of the first control resource set is localized/non-interleaved mapping, or semi-time-first localized/non-interleaved mapping.

Optionally, REGs in a CCE numbered n in the first control resource set is numbered $$m \cdot N_{symb}^{CORESET} + n \bmod N_{symb}^{CORESET} + \left\lfloor \frac{n}{N_{symb}^{CORESET}} \right\rfloor \cdot N_{REG}^{CCE} \cdot N_{symb}^{CORESET}, \text{ or} \quad \text{(Formula 1)}$$

or

REGs in a CCE numbered n in the first control resource set is numbered $$m + (n \bmod N_{symb}^{CORESET}) \cdot N_{RB}^{CORESET} + \left\lfloor \frac{n}{N_{symb}^{CORESET}} \right\rfloor \cdot N_{REG}^{CCE}, \text{ or} \quad \text{(Formula 2)}$$

a CCE numbered n in the first control resource set contains REGs numbered $$m + \left\lfloor \frac{n}{N_{symb}^{CORESET}} \right\rfloor \cdot N_{REG}^{CCE} \quad \text{(Formula 3)}$$

and located in a symbol numbered $n \bmod N_{symb}^{CORESET}$, where m=0, 1, . . . , $N_{REG}^{CCE}-1$, n=0, 1, . . . , $N_{CCE}^{CORESET}-1$, $N_{symb}^{CORESET}$ is a quantity of symbols included in the first control resource set, $N_{REG}^{CCE}$ is a quantity of REGs included in the CCE numbered n in the first control resource set, and $N_{CCE}^{CORESET}$ is a quantity of CCEs included in the first control resource set.

Optionally, $N_{REG}^{REG\text{-}bundle}$ is equal to $N_{REG}^{CCE}$. In this case. $N_{REG}^{CCE}$ in the formula 1, the formula 2, and the formula 3 may be replaced with $N_{REG}^{REG\text{-}bundle}$. In other words, the REG included in the CCE numbered n is the same as REGs in an REG bundle numbered n, and the CCE numbered n includes only one REG bundle numbered n. $N_{REG}^{REG\text{-}bundle}$ is a quantity of REGs included in each REG bundle in the first control resource set. This case is applicable only to a PDCCH demodulated based on a DMRS.

It should be noted that $N_{symb}^{CORESET}$ symbols included in the first control resource set are numbered in ascending order from symbol 0 to symbol $N_{symb}^{CORESET} - 1$.

Specifically, numbers of REGs in the first control resource set are sorted by using the REG numbering method 1, and a mapping relationship between the CCE and the REG is established by using the foregoing formula 1, so that the CCE-to-REG mapping manner is the mapping manner 1.

Numbers of REGs in the first control resource set are sorted by using the REG numbering method 2, and a mapping relationship between the CCE and the REG is established by using the foregoing formula 2, so that the CCE-to-REG mapping manner is the mapping manner 1.

Numbers of REGs in the first control resource set are sorted by using the REG numbering method 3, and a mapping relationship between the CCE and the REG is established by using the foregoing formula 3, so that the CCE-to-REG mapping manner is the mapping manner 1.

Figure 7:
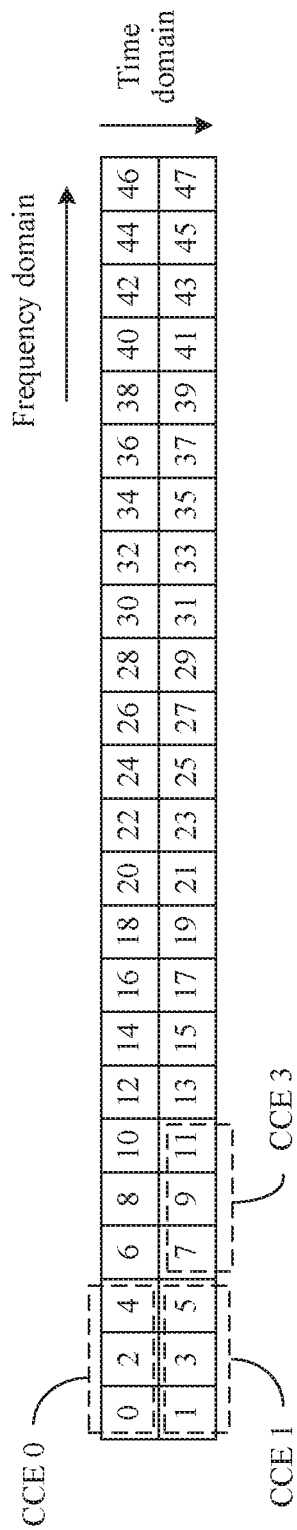
FIG. 7 is a schematic diagram of a mapping manner 1 established based on an REG numbering method 1 according to an embodiment of this application.

For example, FIG. 7 is a schematic diagram of a mapping manner 1 established based on an REG numbering method 1 according to an embodiment of this application. FIG. 7 describes the mapping relationship between the CCE and the REG in the first control resource set by using an example in which the first control resource set occupies two symbols in time domain and each CCE in the first control resource set includes three REGs. It can be obtained by using the formula 1 that a CCE numbered 0 (denoted as a CCE 0) includes an REG numbered 0, an REG numbered 2, and an REG numbered 4: a CCE numbered 1 (denoted as a CCE 1) includes an REG numbered 1, an REG numbered 3, and an REG numbered 5; and a CCE numbered 3 (denoted as a CCE 3) includes an REG numbered 7, an REG numbered 9, and an REG numbered 11.

Figure 8:
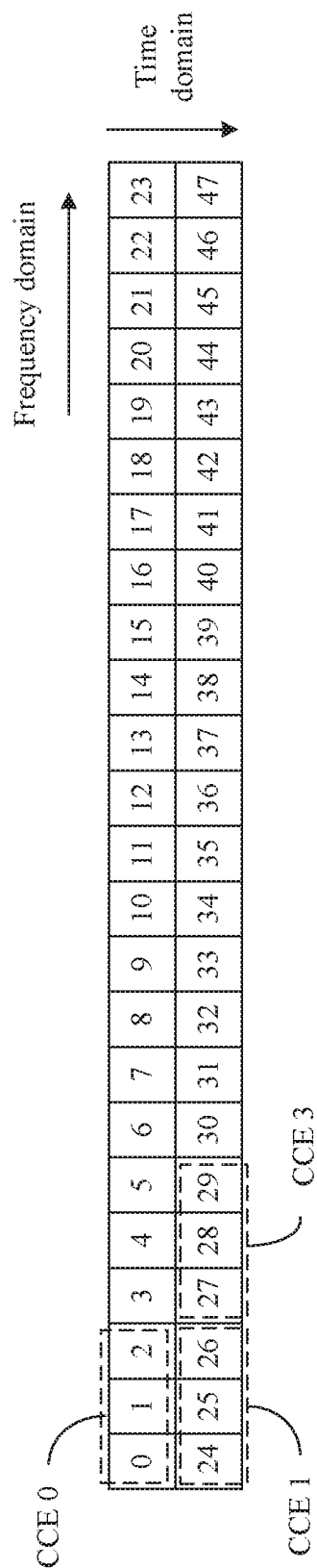
FIG. 8 is a schematic diagram of a mapping manner 1 established based on an REG numbering method 2 according to an embodiment of this application.

For another example, FIG. 8 is a schematic diagram of a mapping manner 1 established based on an REG numbering method 2 according to an embodiment of this application. FIG. 8 describes the mapping relationship between the CCE and the REG in the first control resource set by using an example in which the first control resource set occupies two symbols in time domain and each CCE in the first control resource set includes three REGs. It can be obtained by using the formula 2 that a CCE numbered 0 (denoted as a CCE 0) includes an REG numbered 0, an REG numbered 1, and an REG numbered 2: a CCE numbered 1 (denoted as a CCE 1) includes an REG numbered 24, an REG numbered 25, and an REG numbered 26; and a CCE numbered 3 (denoted as a CCE 3) includes an REG numbered 27, an REG numbered 28, and an REG numbered 29.

Figure 9:
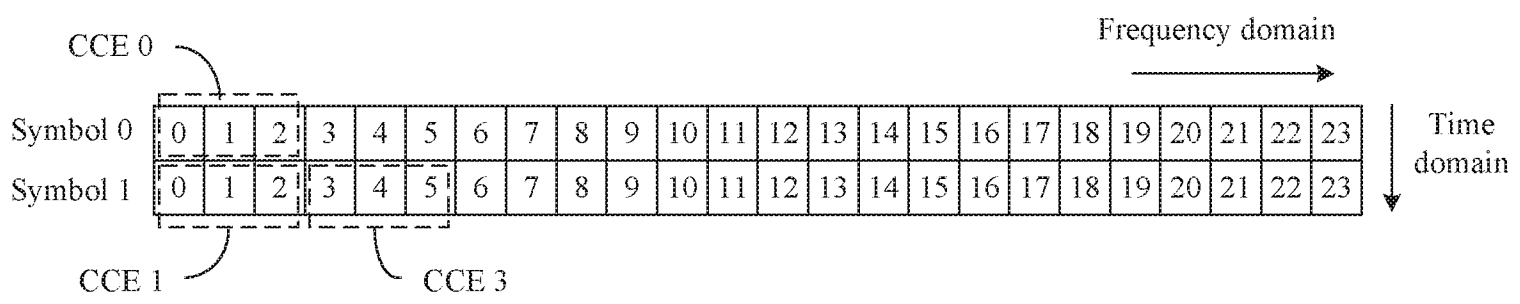

For another example, FIG. 9 is a schematic diagram of a mapping manner 1 established based on an REG numbering method 3 according to an embodiment of this application. FIG. 9 describes the mapping relationship between the CCE and the REG in the first control resource set by using an example in which the first control resource set occupies two symbols in time domain and each CCE in the first control resource set includes three REGs. It can be obtained by using the formula 3 that a CCE numbered 0 (denoted as a CCE 0) includes REGs that occupy a symbol 0 in time domain and are respectively numbered 0, 1, and 2; a CCE numbered 1 (denoted as a CCE 1) includes REGs that occupy a symbol 1 in time domain and are respectively numbered 0, 1, and 2: and a CCE numbered 3 (denoted as a CCE 3) includes REGs that occupy a symbol 1 in time domain and are respectively numbered 3, 4, and 5.

It should be understood that the foregoing formulas may be further used in combination with different REG numbering methods to implement different CCE-to-REG mapping manners. An REG numbering method used in combination with the foregoing formulas is not specifically limited in this embodiment of this application.

In this embodiment of this application, when a quantity of REGs included in one CCE is not an integer multiple of a quantity of symbols occupied by the first control resource set, that is, $N_{REG}^{CCE}$ cannot be exactly divided by $N_{symb}^{CORESET}$, if the mapping manner 3 is used, quantities of REGs in each symbol are not equal in a CCE. This is unfavorable to resource multiplexing. However, the CCE-to-REG mapping manner in the mapping manner 1 is relatively normalized and is favorable to resource multiplexing. For example, a PDSCH resource can be multiplexed.

In addition, the mapping manner 1 may be applied to a CRS-based sPDCCH, a DMRS-based NR-PDCCH, or a DMRS-based sPDCCH.

Mapping Manner 2:

Each CCE in the first control resource set includes a plurality of REGs consecutive in frequency domain, and the plurality of REGs included in each CCE are located in a same symbol or are preferentially located in a same symbol. When $N_{symb}^{CORESET}$ is equal to 1, CCEs in the first control resource set are numbered in ascending order of RB numbers in frequency domain. When $N_{symb}^{CORESET}$ is greater than 1. CCEs in the first control resource set are numbered in a frequency-first manner. In other words, CCEs in the first control resource set are first numbered consecutively in frequency domain. The mapping manner 2 may be referred to as frequency-first localized mapping or frequency-first non-interleaved mapping.

It should be noted that numbers of CCEs in each symbol in the first control resource set increase in a same direction.

Optionally, the mapping manner information of the first control resource set indicates that the mapping manner of the first control resource set is localized/non-interleaved mapping, or frequency-first localized/non-interleaved mapping.

REGs in the first control resource set are numbered in a frequency-first manner, that is, numbered according to the REG numbering method 2, and REGs in a CCE numbered n in the first control resource set is numbered $m + nN_{REG}^{CCE}$, (Formula 4)

where $m = 0, 1, \ldots, N_{REG}^{CCE} - 1$, $n = 0, 1, \ldots, N_{CCE}^{CORESET} - 1$, $N_{REG}^{CCE}$ is a quantity of REGs included in the CCE numbered n in the first control resource set, and $N_{CCE}^{CORESET}$ is a quantity of CCEs included in the first control resource set.

Optionally, $N_{REG}^{REG\text{-}bundle}$ is equal to $N_{REG}^{CCE}$. In this case, the formula 4 may be equivalent to $m + n N_{REG}^{REG\text{-}bundle}$, where $m = 0, 1, \ldots, N_{REG}^{REG\text{-}bundle} - 1$. In other words, the REG included in the CCE numbered n is the same as REGs in an REG bundle numbered n, and the CCE numbered n includes only one REG bundle numbered n. $N_{REG}^{REG\text{-}bundle}$ is a quantity of REGs included in each REG bundle in the first control resource set. This case is applicable only to a PDCCH demodulated based on a DMRS.

In the mapping manner 2 in this embodiment of this application, a frequency-first manner is used for both REG sorting and a CCE mapping manner. This can simplify a calculation formula of a CCE-to-REG mapping manner, and help reduce calculation complexity of the terminal device.

Figure 10:
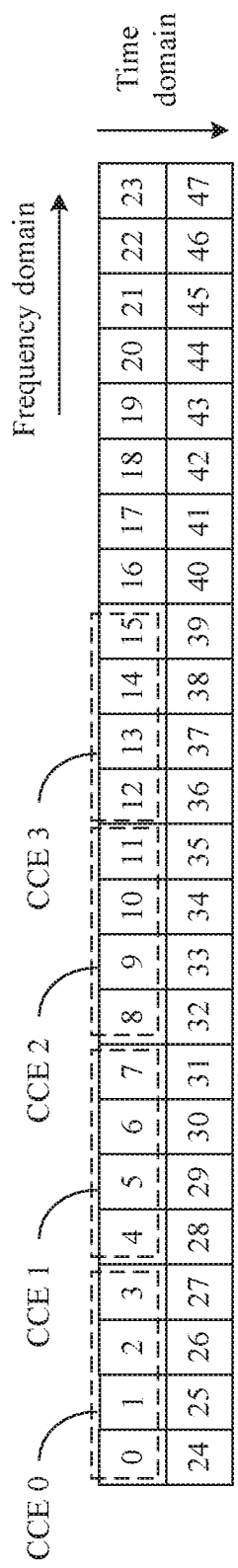
FIG. 10 is a schematic diagram of a mapping manner 2 established based on an REG numbering method 2 according to an embodiment of this application.

For example, FIG. 10 is a schematic diagram of a mapping manner 2 established based on an REG numbering method 2 according to an embodiment of this application. FIG. 10 describes the mapping relationship between the CCE and the REG in the first control resource set by using an example in which the first control resource set occupies two symbols in time domain and each CCE in the first control resource set includes four REGs. It can be obtained by using the formula 4 that a CCE numbered 0 (denoted as a CCE 0) includes REGs that are respectively numbered 0, 1, 2, and 3; a CCE numbered 1 (denoted as a CCE 1) includes REGs that are respectively numbered 4, 5, 6, and 7: a CCE numbered 2 (denoted as a CCE 2) includes REGs that are respectively numbered 8, 9, 10, and 11; and a CCE numbered 3 (denoted as a CCE 3) includes REGs that are respectively numbered 12, 13, 14, and 15.

Optionally, REGs in the first control resource set are numbered in a time-first manner, that is, numbered according to the REG numbering method 1, and REGs in a CCE numbered n in the first control resource set is numbered $$m \cdot N_{symb}^{CORESET} + \left\lfloor \frac{n}{N_{CCE}^{CORESET}/N_{symb}^{CORESET}} \right\rfloor + \left( n \bmod \left( \frac{N_{CCE}^{CORESET}}{N_{symb}^{CORESET}} \right) \right) \cdot N_{REG}^{CCE} \cdot N_{symb}^{CORESET}$$

(Formula 15)

where m=0, 1, ..., $N_{REG}^{CCE}$-1, n=0, 1, ..., $N_{CCE}^{CORESET}$-1, $N_{REG}^{CCE}$ is a quantity of REGs included in the CCE numbered n in the first control resource set, and $N_{CCE}^{CORESET}$ is a quantity of CCEs included in the first control resource set. Optionally, $N_{CCE}^{CORESET}/N_{symb}^{CORESET}$ may be replaced with $N_{RB}^{CORESET}/N_{REG}^{CCE}$.

Optionally, $N_{REG}^{REG-bundle}$ is equal to $N_{REG}^{CCE}$. In this case, $N_{REG}^{CCE}$ in the formula 15 may be replaced with $N_{REG}^{REG-bundle}$. In other words, the REG included in the CCE numbered n is the same as REGs in an REG bundle numbered n, and the CCE numbered n includes only one REG bundle numbered n. $N_{REG}^{REG-bundle}$ is a quantity of REGs included in each REG bundle in the first control resource set. This case is applicable only to a PDCCH demodulated based on a DMRS.

The formula 15 is more complex than the formula 4. However, this allows REGs to be numbered only in a time-first manner in a system, that is, according to the REG numbering method 1.

In the mapping manner 2 in this embodiment of this application, REGs included in one CCE are preferentially located in one symbol. This helps reduce time required for decoding performed by the terminal device and reduce a delay. Preferably, the mapping manner 2 is applicable to a CRS-based PDCCH.

Mapping Manner 3:

When $N_{symb}^{CORESET}$ is equal to 1, each CCE in the first control resource set includes a plurality of REGs consecutive in frequency domain, and CCEs in the first control resource set are numbered in ascending order of RB numbers in frequency domain. When $N_{symb}^{CORESET}$ is greater than 1, each CCE in the first control resource set includes a plurality of REGs consecutive in time domain and in frequency domain, and CCEs in the first control resource set are numbered in a time-first manner, that is, CCEs in the first control resource set are first numbered consecutively in time domain. The mapping manner 3 may be referred to as time-first localized mapping or time-first non-interleaved mapping.

It should be noted that the CCEs in the first control resource set may occupy at least one same symbol.

In the mapping manner 3 in this embodiment of this application, when $N_{symb}^{CORESET}$ is greater than 1, fewer frequency domain resources in the first control resource set are occupied for the mapping manner 3 as compared with the mapping manner 2. This is favorable to resource multiplexing. For example, more frequency domain resources can be released for a PDSCH to use. The mapping manner 3 may be applied to a CRS-based sPDCCH, a DMRS-based NR-PDCCH, or a DMRS-based sPDCCH.

Optionally, the mapping manner information of the first control resource set indicates that the mapping manner of the first control resource set is localized/non-interleaved mapping, or time-first localized/non-interleaved mapping.

REGs in the first control resource set are numbered in a time-first manner, that is, numbered according to the REG numbering method 1, and REGs in a CCE numbered n in the first control resource set is numbered m+n$N_{REG}^{CCE}$, (Formula 4)

where m=0, 1 ..., $N_{REG}^{CCE}$-1, n=0, 1, ..., $N_{CCE}^{CORESET}$-1, $N_{REG}^{CORESET}$ is a quantity of REGs included in the CCE numbered n in the first control resource set, and $N_{CCE}^{CORESET}$ is a quantity of CCEs included in the first control resource set.

Optionally, $N_{REG}^{REG-bundle}$ is equal to $N_{REG}^{CCE}$. In this case, the formula 4 may be equivalent to m+n$N_{REG}^{REG-bundle}$, where m=0, 1, ..., $N_{REG}^{REG-bundle}$-1. In other words, REGs in an REG bundle numbered n is equal to the REG included in the CCE numbered n, and the CCE numbered n includes only one REG bundle numbered n. $N_{REG}^{REG-bundle}$ is a quantity of REGs included in each REG bundle in the first control resource set. This case is applicable only to a PDCCH demodulated based on a DMRS, for example, a DMRS-based NR-PDCCH or a DMRS-based sPDCCH.

In the mapping manner 3 in this embodiment of this application, a time-first manner is used for both an REG numbering method and a CCE-to-REG mapping manner. This helps simplify a calculation formula for determining the CCE-to-REG mapping manner, and helps reduce calculation complexity of the terminal device.

Figure 11:
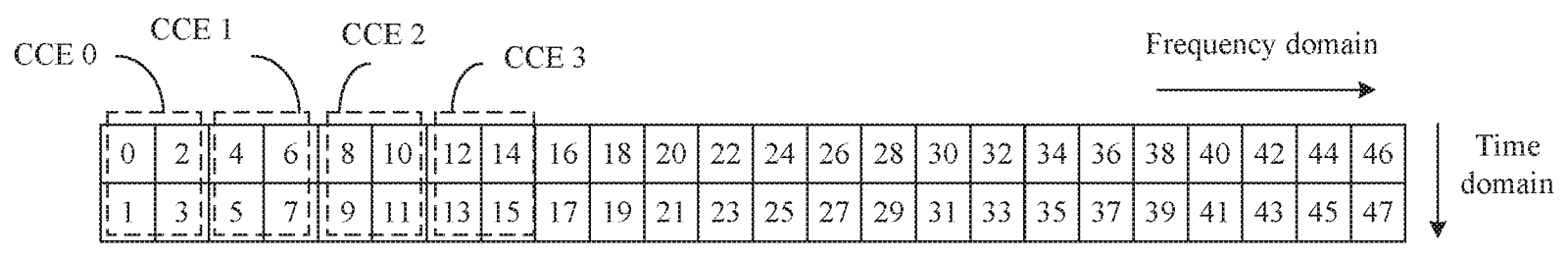

For example, FIG. 11 is a schematic diagram of a mapping manner 3 established based on an REG numbering method 1 according to an embodiment of this application. FIG. 11 describes the mapping relationship between the CCE and the REG in the first control resource set by using an example in which the first control resource set occupies two symbols in time domain and each CCE in the first control resource set includes four REGs. It can be obtained by using the formula 4 that a CCE numbered 0 (denoted as a CCE 0) includes REGs that are respectively numbered 0, 1, 2, and 3; a CCE numbered 1 (denoted as a CCE 1) includes REGs that are respectively numbered 4, 5, 6, and 7; a CCE numbered 2 (denoted as a CCE 2) includes REGs that are respectively numbered 8, 9, 10, and 11; and a CCE numbered 3 (denoted as a CCE 3) includes REGs that are respectively numbered 12, 13, 14, and 15.

Figure 12:
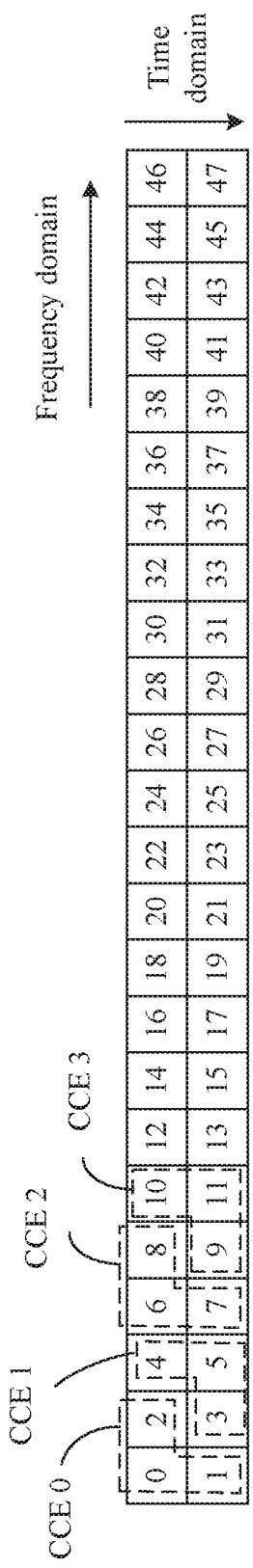
FIG. 12 is a schematic diagram of a mapping manner 3 established based on an REG numbering method 1 according to an embodiment of this application.

For another example, FIG. 12 is a schematic diagram of a mapping manner 3 established based on an REG numbering method 1 according to an embodiment of this application. FIG. 12 describes the mapping relationship between the CCE and the REG in the first control resource set by using an example in which the first control resource set occupies two symbols in time domain and each CCE in the first control resource set includes three REGs. It can be obtained by using the formula 4 that a CCE numbered 0 (denoted as a CCE 0) includes REGs that are respectively numbered 0, 1, and 2; a CCE numbered 1 (denoted as a CCE 1) includes REGs that are respectively numbered 3, 4, and 5; a CCE numbered 2 (denoted as a CCE 2) includes REGs that are respectively numbered 6, 7, and 8; and a CCE numbered 3 (denoted as a CCE 3) includes REGs that are respectively numbered 9, 10, and 11.

Optionally, REGs in the first control resource set are numbered in a time-first manner, that is, numbered according to the REG numbering method 1, and REGs in a CCE numbered n in the first control resource set is numbered $(m+jN_{REG-bundle}^{CCE})+nN_{REG-bundle}^{CCE}N_{REG}^{REG-bundle}$, (Formula 5)

where $j=0, 1, \ldots, N_{REG-bundle}^{CCE}-1$, $m=0, 1, \ldots, N_{REG}^{REG-bundle}-1$, $n=0, 1, \ldots, N_{CCE}^{CORESET}-1$, $N_{REG-bundle}^{CCE}$ is a quantity of REG bundles included in each CCE in the first control resource set, $N_{REG}^{REG-bundle}$ is a quantity of REGs included in each REG bundle in the first control resource set, $N_{REG}^{CCE}$ is a quantity of REGs included in each CCE in the first control resource set, and $N_{CCE}^{CORESET}$ is a quantity of CCEs included in the first control resource set.

Optionally, the formula 5 may be described by using two steps: A first step is to determine REGs included in one REG bundle, and a second step is to determine REG bundles included in one CCE. Specifically, REGs in an REG bundle numbered j in the first control resource set is numbered $m+jN_{REG}^{REG-bundle}$, where $j=0, 1, \ldots, N_{REG-bundle}^{CORESET}-1$ and $m=0, 1, \ldots, N_{REG}^{REG-bundle}-1$; an REG bundle included in a CCE numbered n in the first control resource set is numbered $x+nN_{REG-bundle}^{CCE}$, where $x=0, 1, \ldots, N_{REG-bundle}^{CCE}-1$ and $n=0, 1, \ldots, N_{CCE}^{CORESET}-1$. If $N_{REG-bundle}^{CCE}$ is equal to 1, the REG bundle included in the CCE numbered n in the first control resource set is numbered n.

In this embodiment of this application, the CCE-to-REG mapping manner determined in the foregoing formula 5 is applicable only to a PDCCH demodulated based on a DMRS, for example, a DMRS-based NR-PDCCH or a DMRS-based sPDCCH.

Mapping Manner 4:

When $N_{symb}^{CORESET}$ is equal to 1, a CCE in the first control resource set includes a plurality of REGs discretely (or non-consecutively) distributed in frequency domain. When $N_{symb}^{CORESET}$ is greater than 1, each CCE in the first control resource set includes a plurality of REGs consecutive in time domain and discretely distributed in frequency domain. The mapping manner 4 may be referred to as time-first distributed mapping or time-first interleaved mapping.

Optionally, the mapping manner information of the first control resource set indicates that the mapping manner of the first control resource set is distributed-interleaved mapping, or time-first distributed/interleaved mapping.

Optionally, REGs in the first control resource set are numbered in a time-first manner, that is, numbered according to the REG numbering method 1, and REGs in a CCE numbered n in the first control resource set is numbered $$l + n \cdot N_{symb}^{CORESET} + j \cdot \left\lfloor \frac{N_{REG}^{CORESET}}{\left(\frac{N_{REG}^{CCE}}{N_{symb}^{CORESET}}\right)} \right\rfloor, \quad \text{(Formula 6)}$$

where $l=0, 1, \ldots, N_{symb}^{CORESET}-1$, $n=0, 1, \ldots, N_{CCE}^{CORESET}-1$, $$j = 0, 1, \ldots, \frac{N_{REG}^{CCE}}{N_{symb}^{CORESET}} - 1,$$

$N_{symb}^{CORESET}$ is a quantity of symbols included in the first control resource set, $N_{REG}^{CORESET}$ is a quantity of REGs included in the first control resource set, $N_{REG}^{CCE}$ is a quantity of REGs included in the CCE numbered n in the first control resource set, and $N_{CCE}^{CORESET}$ is a quantity of CCEs included in the first control resource set.

Alternatively, REGs in the first control resource set are numbered in a time-first manner, that is, numbered according to the REG numbering method 1, and REGs in a CCE numbered n in the first control resource set is numbered $$l + N_{symb}^{CORESET} \cdot \left(n + j \cdot \left\lfloor \frac{N_{RB}^{CORESET}}{\left(\frac{N_{REG}^{CCE}}{N_{symb}^{CORESET}}\right)} \right\rfloor\right), \quad \text{(Formula 7)}$$

where $l=0, 1, \ldots, N_{symb}^{CORESET}-1$, $n=0, 1, \ldots, N_{CCE}^{CORESET}-1$, $$j = 0, 1, \ldots, \frac{N_{REG}^{CCE}}{N_{symb}^{CORESET}} - 1,$$

$N_{symb}^{CORESET}$ is a quantity of symbols included in the first control resource set, $N_{RB}^{CORESET}$ is a quantity of RBs included in the first control resource set, $N_{REG}^{CCE}$ is a quantity of REGs included in the CCE numbered n in the first control resource set, and $N_{CCE}^{CORESET}$ is a quantity of CCEs included in the first control resource set.

Alternatively, REGs in the first control resource set are numbered in a time-first manner, that is, numbered according to the REG numbering method 1, and REGs in a CCE numbered n in the first control resource set is numbered $$m + n \cdot N_{REG}^{REG-bundle} + j \cdot \left\lfloor \frac{N_{REG}^{CORESET}}{N_{REG-bundle}^{CCE}} \right\rfloor. \quad \text{(Formula 8)}$$

Alternatively, REGs in the first control resource set are numbered in a time-first manner, that is, numbered according to the REG numbering method 1, and when each REG bundle in the first control resource set occupies one RB in frequency domain, REGs in a CCE numbered n in the first control resource set is numbered $$m + N_{REG}^{REG-bundle}\left(n + j \cdot \left\lfloor \frac{N_{RB}^{CORESET}}{N_{REG-bundle}^{CCE}} \right\rfloor\right), \quad \text{(Formula 9)}$$

where $j=0, 1, \ldots, N_{REG-bundle}^{CCE}-1$, $m=0, 1, \ldots, N_{REG}^{REG-bundle}-1$, $n=0, 1, \ldots, N_{CCE}^{CORESET}-1$, $N_{REG}^{REG-bundle}$ is a quantity of REGs included in each REG bundle in the first control resource set, $N_{REG-bundle}^{CCE}$ is a quantity of REG bundles included in each CCE in the first control resource set, $N_{REG}^{CORESET}$ is a quantity of REGs included in the first control resource set, $N_{CCE}^{CORESET}$ is a quantity of CCEs included in the first control resource set, and $N_{RB}^{CORESET}$ is a quantity of RBs included in the first control resource set.

Specifically, numbers of REGs in the first control resource set are sorted by using the REG numbering method 1, and a mapping relationship between the CCE and the REG is established by using the foregoing formula 6, formula 7, formula 8, or formula 9, so that the CCE-to-REG mapping manner is the mapping manner 4. The formula 8 and the formula 9 are applicable only to a PDCCH demodulated based on a DMRS, for example, a DMRS-based NR-PDCCH or a DMRS-based sPDCCH.

Figure 13:
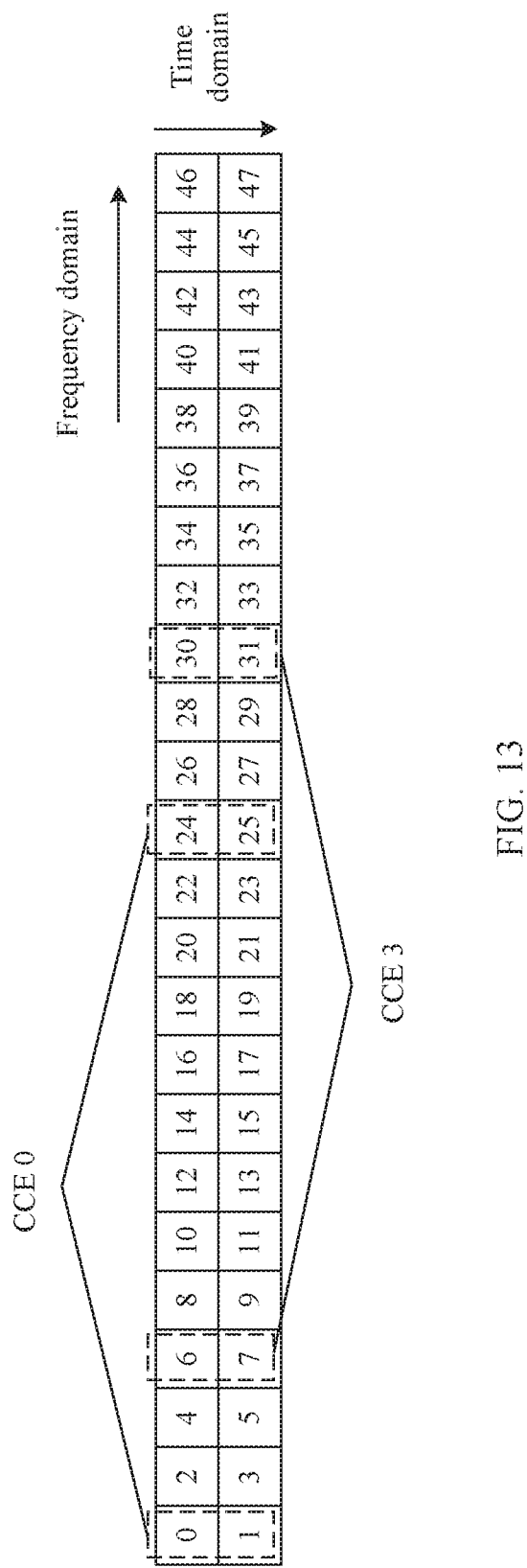
FIG. 13 is a schematic diagram of a mapping manner 4 established based on an REG numbering method 1 according to an embodiment of this application.

For example, FIG. 13 is a schematic diagram of a mapping manner 4 established based on an REG numbering method 1 according to an embodiment of this application. FIG. 13 describes the mapping relationship between the CCE and the REG in the first control resource set by using an example in which the first control resource set occupies two symbols in time domain and each CCE in the first control resource set includes four REGs. For brevity of description, only REGs included in CCEs numbered 0 and 3 are listed. It can be obtained by using the formula 6 or the formula 7 that the CCE numbered 0 (denoted as a CCE 0) includes REGs respectively numbered 0, 1, 24, and 25; and the CCE numbered 3 (denoted as a CCE 3) includes REGs respectively numbered 6, 7, 30, and 31.

Figure 14:
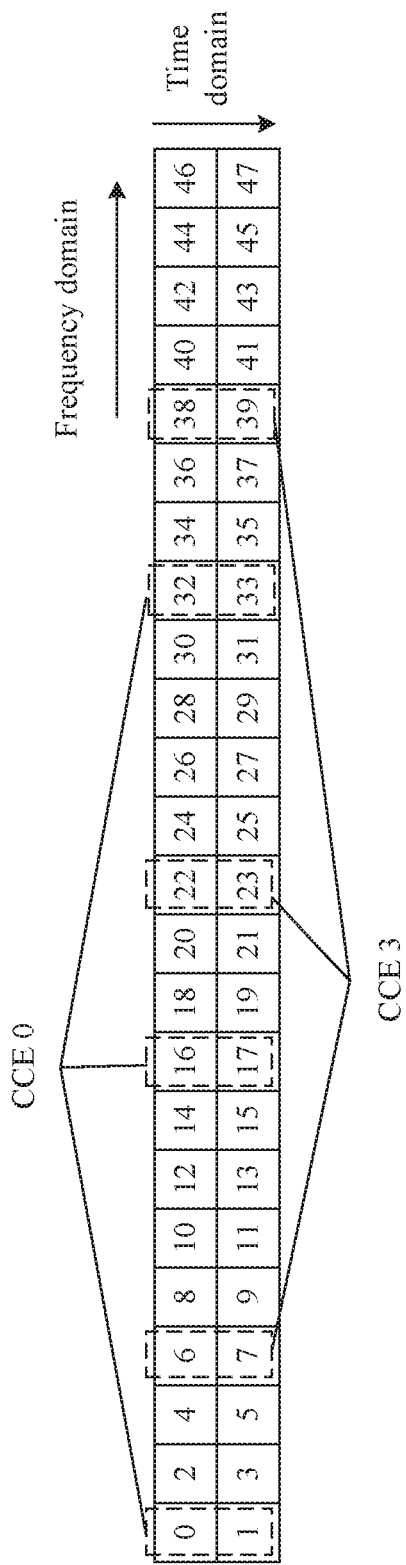
FIG. 14 is a schematic diagram of a mapping manner 4 established based on an REG numbering method 1 according to an embodiment of this application.

For another example, FIG. 14 is a schematic diagram of a mapping manner 4 established based on an REG numbering method 1 according to an embodiment of this application. FIG. 14 describes the mapping relationship between the CCE and the REG in the first control resource set by using an example in which the first control resource set occupies two symbols in time domain and $N_{REG}^{CCE}=6$, $N_{REG-bundle}^{CCE}=3$, and $N_{REG}^{REG-bundle}=2$. For brevity of description, only REGs included in CCEs numbered 0 and 3 are listed. The mapping relationship between the CCE and the REG can be obtained by using the formula 8 as follows: The CCE numbered 0 (denoted as a CCE 0) includes REGs respectively numbered 0, 1, 16, 17, 32, and 33, and the CCE numbered 3 (denoted as a CCE 3) includes REGs respectively numbered 6, 7, 22, 23, 38, and 39.

Optionally, REGs in the first control resource set are numbered in a time-first manner, that is, numbered according to the REG numbering method 1, and REGs included in one CCE may be obtained by performing two steps: A first step is to determine REGs included in one REG bundle, and a second step is to determine REG bundles included in one CCE.

Optionally, REGs in an REG bundle numbered j in the first control resource set is numbered $m+jN_{REG}^{REG-bundle}$ where $j=0, 1, \ldots, N_{REG-bundle}^{CORESET}$ or $j=0, 1, \ldots, \lfloor N_{REG-bundle}^{CORESET}/N_{REG}^{REG-bundle} \rfloor$, and $m=0, 1, \ldots, N_{REG}^{REG-bundle}-1$; and an REG bundle included in a CCE numbered n in the first control resource set is numbered $n+x \cdot \lfloor N_{REG-bundle}^{CORESET}/N_{REG-bundle}^{CCE} \rfloor$ or $n+x \cdot N_{CCE}^{CORESET}$, where $x=0, 1, \ldots, N_{REG-bundle}^{CCE}-1$ and $n=0, 1, \ldots, N_{CCE}^{CORESET}-1$. This formula is especially applicable to a scenario in which $N_{REG}^{REG-bundle}$ is less than $N_{REG}^{CCE}$.

For example, if the first control resource set occupies two symbols in time domain, there are 24 REGs in total, and one REG bundle includes two REGs, there are 12 REG bundles, and REGs included in an REG bundle 0 to an REG bundle 11 are respectively numbered {0, 1}, {2, 3}, {4, 5}, {6, 7}, {8, 9}, {10, 11}, {12, 13}, {14, 15}, {16, 17}, {18, 19}, {20, 21}, and {22, 23}. It is assumed that each CCE includes three REG bundles, that is, six REGs. Then, a CCE 0 includes REG bundles 0, 4, and 8, a CCE 1 includes REG bundles 1, 5, and 9, a CCE 2 includes REG bundles 2, 6, and 10, and a CCE 3 includes REG bundles 3, 7, and 11.

Optionally, REGs in an REG bundle numbered j in the first control resource set is numbered $m+jN_{REG}^{REG-bundle}$, where $j=0, 1, \ldots, N_{REG-bundle}^{CORESET}-1$ or $j=0, 1, \ldots, \lfloor N_{REG-bundle}^{CORESET}/N_{REG}^{REG-bundle} \rfloor$, and $m=0, 1, \ldots, N_{REG}^{REG-bundle}-1$; and an REG bundle included in a CCE numbered n in the first control resource set is numbered $f(x,n,c)$, where $f(\cdot)$ indicates an interleaver (interleaver), $x=0, 1, \ldots, N_{REG-bundle}^{CCE}-1$ $n=0, 1, \ldots, N_{CCE}^{CORESET}-1$, and c is a positive integer greater than 1. For example, c is equal to 2, 3, 4, 6, or 8. For example, the terminal device determines that a value of c is 2, 3, or 6 based on received signaling.

Optionally, a value of c indicates a PDCCH aggregation level greater than 1, for example, 2, 4, or 8. Optionally, if $N_{REG}^{REG-bundle}=2$, c=3; or if $N_{REG}^{REG-bundle}=3$, c=2.

The mapping manner 4 in this embodiment of this application may be applied to a CRS-based sPDCCH, a DMRS-based NR-PDCCH, or a DMRS-based sPDCCH. When $N_{symb}^{CORESET}$ is greater than 1, fewer frequency domain resources in the first control resource set are occupied for the CCE-to-REG mapping manner described in the mapping manner 4 as compared with the mapping manner 5 or the mapping manner 6. This is favorable to resource multiplexing. For example, more frequency domain resources can be released for a physical downlink shared channel (Physical Downlink Shared Channel, PDSCH) to use.

For the mapping manner 3 and/or the mapping manner 4, when a total quantity of all REGs in the first control resource set is not an integer multiple of a total quantity of REGs included in one CCE, some REGs cannot be used. Optionally, to avoid REG waste, a total quantity of REGs included in one symbol in the first control resource set is an integer multiple of a total quantity of REGs included in one CCE. In other words, $N_{REG}^{CORESET}$ is an integer multiple of $N_{REG}^{CCE}$, or $N_{REG}^{CORESET}=a \cdot N_{REG}^{CCE}$, where a is a positive integer.

Mapping Manner 5:

Each CCE in the first control resource set includes a plurality of REGs discretely (or non-consecutively) distributed in frequency domain, and the plurality of REGs included in each CCE are located in a same symbol. When $N_{symb}^{CORESET}$ is greater than 1, CCEs in the first control resource set are numbered in a frequency-first manner. In other words, CCEs in the first control resource set are first numbered in frequency domain. The mapping manner 5 may be referred to as frequency-first distributed mapping or frequency-first interleaved mapping.

Optionally, the mapping manner information of the first control resource set indicates that the mapping manner of the first control resource set is distributed/interleaved mapping, or frequency-first distributed/interleaved mapping.

Optionally, a CCE numbered n in the first control resource set contains REGs numbered $$N_{symb}^{CORESET} \cdot \left(n \bmod \left(\frac{N_{CCE}^{CORESET}}{N_{symb}^{CORESET}}\right)\right) + \left\lfloor \frac{n}{\left(\frac{N_{CCE}^{CORESET}}{N_{symb}^{CORESET}}\right)} \right\rfloor + m \cdot N_{CCE}^{CORESET}, \text{ or} \quad \text{(Formula 10)}$$

or a CCE numbered n in the first control resource set contains REGs numbered $$n \bmod \left( \frac{N_{CCE}^{CORESET}}{N_{symb}^{CORESET}} \right) + \quad \text{(Formula 11)}$$

$$\left\lfloor \frac{n}{\left( \frac{N_{CCE}^{CORESET}}{N_{symb}^{CORESET}} \right)} \right\rfloor \cdot N_{RB}^{CORESET} + m \cdot \left\lfloor \frac{N_{RB}^{CORESET}}{N_{REG}^{CCE}} \right\rfloor, \text{ or}$$

or a CCE numbered n in the first control resource set contains REGs numbered $$n \bmod \left( \frac{N_{CCE}^{CORESET}}{N_{symb}^{CORESET}} \right) + m \cdot \left\lfloor \frac{N_{RB}^{CORESET}}{N_{REG}^{CCE}} \right\rfloor \quad \text{(Formula 12)}$$

and located in a symbol numbered $$\left\lfloor \frac{n}{\left( \frac{N_{CCE}^{CORESET}}{N_{symb}^{CORESET}} \right)} \right\rfloor,$$

where n=0, 1, ..., $N_{CCE}^{CORESET}-1$, m=0, 1, ..., $N_{REG}^{CCE}$, $N_{symb}^{CORESET}$ is a quantity of symbols included in the first control resource set, $N_{REG}^{CCE}$ is a quantity of REGs included in the CCE numbered n in the first control resource set, $N_{CCE}^{CORESET}$ is a quantity of CCEs included in the first control resource set, and $N_{RB}^{CORESET}$ is a quantity of resource blocks included in the first control resource set.

Specifically, numbers of REGs in the first control resource set are sorted by using the REG numbering method 1, and a mapping relationship between the CCE and the REG is established by using the foregoing formula 10, so that the CCE-to-REG mapping manner is the mapping manner 5.

Numbers of REGs in the first control resource set are sorted by using the REG numbering method 2, and a mapping relationship between the CCE and the REG is established by using the foregoing formula 11, so that the CCE-to-REG mapping manner is the mapping manner 5.

Numbers of REGs in the first control resource set are sorted by using the REG numbering method 3, and a mapping relationship between the CCE and the REG is established by using the foregoing formula 12, so that the CCE-to-REG mapping manner is the mapping manner 5.

Figure 15:
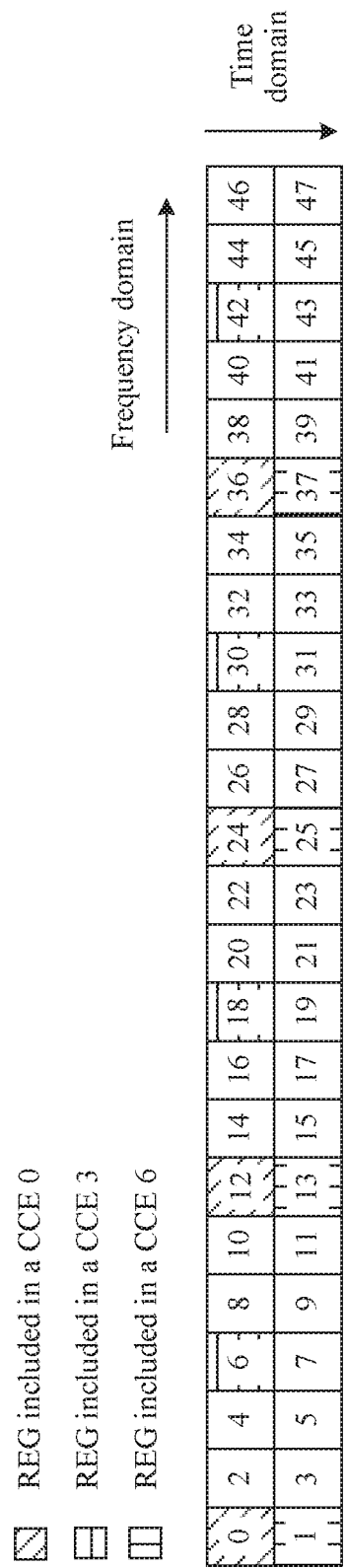
FIG. 15 is a schematic diagram of a mapping manner 5 established based on an REG numbering method 1 according to an embodiment of this application.

For example, FIG. 15 is a schematic diagram of a mapping manner 5 established based on an REG numbering method 1 according to an embodiment of this application. FIG. 15 describes the mapping relationship between the CCE and the REG in the first control resource set by using an example in which the first control resource set occupies two symbols in time domain and each CCE in the first control resource set includes four REGs. For brevity, only REGs included in CCEs numbered 0, 3, and 6 are described. It can be obtained by using the formula 10 that the CCE numbered 0 (denoted as a CCE 0) includes REGs respectively numbered 0, 12, 24, and 36; the CCE numbered 3 (denoted as a CCE 3) includes REGs respectively numbered 6, 18, 30, and 42; and the CCE numbered 6 (denoted as a CCE 6) includes REGs respectively numbered 1, 13, 25, and 37.

Figure 16:
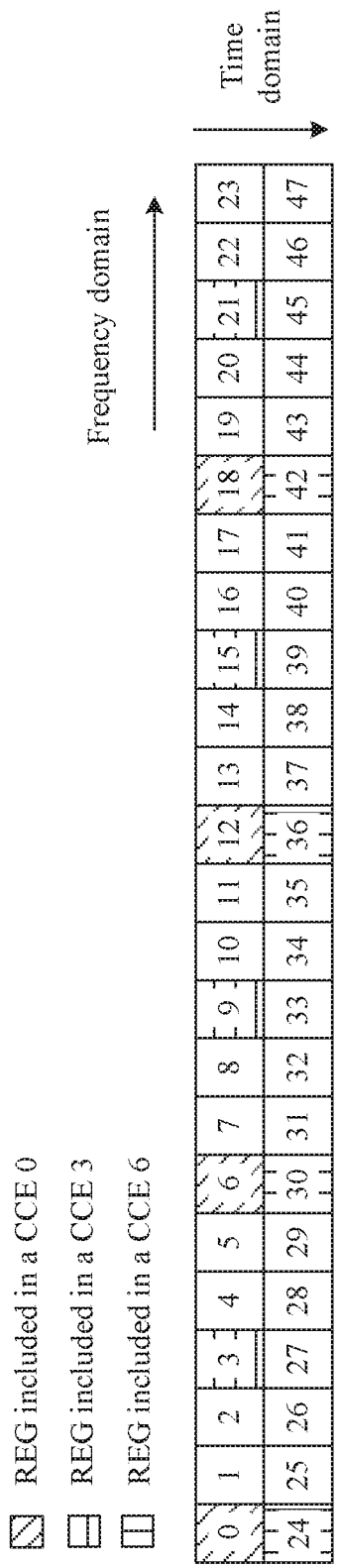
FIG. 16 is a schematic diagram of a mapping manner 5 established based on an REG numbering method 2 according to an embodiment of this application.

For another example, FIG. 16 is a schematic diagram of a mapping manner 5 established based on an REG numbering method 2 according to an embodiment of this application. FIG. 16 describes the mapping relationship between the CCE and the REG in the first control resource set by using an example in which the first control resource set occupies two symbols in time domain and each CCE in the first control resource set includes four REGs. For brevity, only REGs included in CCEs numbered 0, 3, and 6 are described. It can be obtained by using the formula 11 that the CCE numbered 0 (denoted as a CCE 0) includes REGs respectively numbered 0, 6, 12, and 18; the CCE numbered 3 (denoted as a CCE 3) includes REGs respectively numbered 3, 9, 15, and 21; and the CCE numbered 6 (denoted as a CCE 6) includes REGs respectively numbered 24, 30, 36, and 42.

Figure 17:
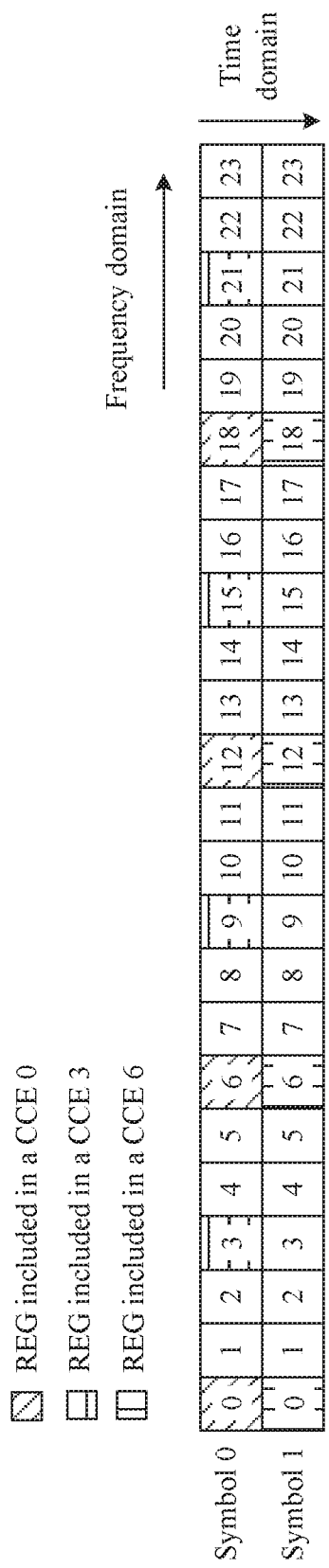
FIG. 17 is a schematic diagram of a mapping manner 5 established based on an REG numbering method 3 according to an embodiment of this application.

For another example, FIG. 17 is a schematic diagram of a mapping manner 5 established based on an REG numbering method 3 according to an embodiment of this application. FIG. 17 describes the mapping relationship between the CCE and the REG in the first control resource set by using an example in which the first control resource set occupies two symbols in time domain and each CCE in the first control resource set includes four REGs. For brevity, only REGs included in CCEs numbered 0, 3, and 6 are described. It can be obtained by using the formula 12 that the CCE numbered 0 (denoted as a CCE 0) includes REGs that occupy a symbol 0 in time domain and that are respectively numbered 0, 6, 12, and 18; the CCE numbered 3 (denoted as a CCE 3) includes REGs that occupy a symbol 0 in time domain and that are respectively numbered 3, 9, 15, and 21; and the CCE numbered 6 (denoted as a CCE 6) includes REGs that occupy a symbol 1 in time domain and that are respectively numbered 0, 6, 12, and 18.

Optionally, REGs in the first control resource set are numbered in a frequency-first manner, that is, numbered according to the REG numbering method 2, and numbers of REGs included in one CCE may be obtained by performing two steps: A first step is to determine REGs included in one REG bundle, and a second step is to determine REG bundles included in one CCE.

Specifically, REGs in an REG bundle numbered j in the first control resource set is numbered $m+jN_{REG}^{REG-bundle}$, where j=0, 1, ..., $N_{REG-bundle}^{CORESET}-1$ or j=0, 1, ..., $\lfloor N_{REG-bundle}^{CORESET}/N_{REG}^{REG-bundle} \rfloor$, and m=0, 1, ..., $N_{REG}^{REG-bundle}-1$; and an REG bundle included in a CCE numbered n in the first control resource set is numbered $n \bmod(\lfloor N_{CCE}^{CORESET}/N_{symbol}^{CORESET} \rfloor) + \lfloor n/\lfloor N_{CCE}^{CORESET}/N_{symbol}^{CORESET} \rfloor \rfloor * (N_{RB}^{CORESET}/N_{REG}^{REG-bundle} + x \cdot \lfloor N_{REG-bundle}^{CORESET}/N_{REG-bundle}^{CCE} \rfloor$, where x=0, 1, ..., $N_{REG-bundle}^{CCE}-1$, n=0, 1, ..., $N_{CCE}^{CORESET}-1$, $N_{symb}^{CORESET}$ is a quantity of symbols included in the first control resource set, $N_{CCE}^{CORESET}$ is a quantity of CCEs included in the first control resource set, $N_{RB}^{CORESET}$ is a quantity of resource blocks included in the first control resource set, $N_{REG}^{REG-bundle}$ is a quantity of REGs included in each REG bundle in the first control resource set, $N_{REG-bundle}^{CCE}$ is a quantity of REG bundles included in each CCE in the first control resource set, and $N_{REG-bundle}^{CORESET}$ is a quantity of REG bundles included in the first control resource set.

The mapping manner 5 in this embodiment of this application is especially applicable to a CRS-based sPDCCH and a DMRS-based NR-PDCCH.

Optionally, in the mapping manner 5, a CCE numbered n in the first control resource set contains REGs numbered $$n \bmod \left\lfloor \frac{N_{RB}^{CORESET}}{N_{REG}^{CCE}} \right\rfloor + \qquad \text{(formula 31)}$$

$$\left\lfloor \frac{n \cdot N_{REG}^{CCE}}{N_{RB}^{CORESET}} \right\rfloor \cdot N_{RB}^{CORESET} + m \cdot \left\lfloor \frac{N_{RB}^{CORESET}}{N_{REG}^{CCE}} \right\rfloor,$$

where n=0, 1, . . . , $N_{CCE}^{CORESET}-1$, m=0, 1, . . . , $N_{REG}^{CCE}-1$, $N_{REG}^{CCE}$ is a quantity of REGs included in the CCE numbered n in the first control resource set, $N_{CCE}^{CORESET}$ is a quantity of CCEs included in the first control resource set, and $N_{RB}^{CORESET}$ is a quantity of resource blocks included in the first control resource set, that is, a total quantity of REGs included in one symbol in the first control resource set. As described above, "CORESET" may be interchanged with "$X_p$". Therefore, the formula 31 may be equivalent to $$n \bmod \left\lfloor \frac{N_{RB}^{X_p}}{N_{REG}^{CCE}} \right\rfloor + \left\lfloor \frac{n \cdot N_{REG}^{CCE}}{N_{RB}^{X_p}} \right\rfloor \cdot N_{RB}^{X_p} + m \cdot \left\lfloor \frac{N_{RB}^{X_p}}{N_{REG}^{CCE}} \right\rfloor. \qquad \text{(formula 32)}$$

It should be noted that "$X_p$" and "m" are merely signs, and may be replaced with "$X_m$" and "j", or the like. However, applicable scenarios of the formulas 31 and 32 are limited. When $N_{RB}^{X_p}$ is not an integer multiple of $N_{REG}^{CCE}$, that is, $$\frac{N_{RB}^{X_p}}{N_{REG}^{CCE}}$$

is not an integer, the formulas 31 and 32 are inapplicable. For example, if a total quantity of REGs in one symbol is 31, that is, $N_{RB}^{X_p}$ is equal to 31, $N_{REG}^{CCE}$ is equal to 4, and the first control resource set includes two symbols, that is, $N_{symb}^{CORESET}=2$, the first control resource set includes 62 REGs. According to the formulas 31 and 32, the four REGs included in the CCE 0 are REGs numbered 0, 7, 14, and 21, and the four REGs included in the CCE 7 are also REGs numbered 0, 7, 14, and 21. Therefore, the formulas are applicable only to a case in which $$\frac{N_{RB}^{X_p}}{N_{REG}^{CCE}}$$

is an integer.

To avoid a case similar to the overlapping between the CCE 0 and the CCE 7, when the formulas 31 and 32 are used, a quantity of RBs in the first control resource set needs to be limited. Specifically, a total quantity of REGs included in one symbol in the first control resource set is an integer multiple of a total quantity of REGs included in one CCE. In other words, $N_{RB}^{X_p}$ (that is, $N_{RB}^{CORESET}$) is an integer multiple of $N_{REG}^{CCE}$, or $N_{RB}^{X_p}=a \cdot N_{REG}^{CCE}$, where a is a positive integer. In this case, $$\frac{N_{RB}^{X_p}}{N_{REG}^{CCE}}$$

is a positive integer.

To expand application scopes of the formula 31 and the formula 32, a formula 33 and a formula 34 are introduced. A CCE numbered n in the first control resource set contains REGs numbered $$n \bmod \left\lfloor \frac{N_{RB}^{CORESET}}{N_{REG}^{CCE}} \right\rfloor + \qquad \text{(formula 33)}$$

$$\left\lfloor \frac{n}{\left\lfloor \frac{N_{RB}^{CORESET}}{N_{REG}^{CCE}} \right\rfloor} \right\rfloor \cdot N_{RB}^{CORESET} + m \cdot \left\lfloor \frac{N_{RB}^{CORESET}}{N_{REG}^{CCE}} \right\rfloor \quad \text{or}$$

$$n \bmod \left\lfloor \frac{N_{RB}^{X_p}}{N_{REG}^{CCE}} \right\rfloor + \left\lfloor \frac{n}{\left\lfloor \frac{N_{RB}^{X_p}}{N_{REG}^{CCE}} \right\rfloor} \right\rfloor \cdot N_{RB}^{X_p} + m \cdot \left\lfloor \frac{N_{RB}^{X_p}}{N_{REG}^{CCE}} \right\rfloor. \qquad \text{(formula 34)}$$

In this case, the CCE 0 includes REGs numbered 0, 7, 14, and 21, and the CCE 7 includes REGs numbered 31, 38, 45, and 52. It should be noted that for explanations on parameters of the formulas 33 and 34, reference may be made to the formulas 31 and 32 in the above paragraph. Details are not described herein again.

It should be noted that the formula 11 has a larger application scope than the formulas 31 and 32, and the case of the overlapping between the CCE 0 and the CCE 7 does not occur. As described above, in the mapping manner 5, the plurality of REGs included in each CCE are located in a same symbol, and quantities of REGs included in different symbols are the same. Therefore, quantities of CCEs included in different symbol are the same. In this case, $$\frac{N_{CCE}^{CORESET}}{N_{symb}^{CORESET}}$$

is certainly a positive integer.

For the formula 11, the formula 31, the formula 32, the formula 33, and the formula 34, numbers of REGs in the first control resource set are sorted by using the REG numbering method 2, frequency-first. That is, REGs are numbered in frequency-first ascending order. To be specific, the REGs in the first control resource set are numbered in frequency-first-time-second ascending order. The frequency-first-time-second means that the REGs are first sorted in all frequency domain RBs in one symbol, and then the REGs are sorted in all frequency domain RBs in a next symbol. For example, in the first control resource set, an REG located in a first symbol in time domain and in an RB with a smallest number in frequency domain is numbered 0, and two adjacent REGs in time domain are numbered non-consecutively. For example, in the first control resource set, numbers of REGs located in a first symbol increase in ascending order of RB numbers in the first control resource set, and numbers of REGs located in a second symbol increase in descending order of RB numbers in the first control resource set.

For the mapping manner 5, when a total quantity of REGs included in one symbol is not an integer multiple of a total quantity of REGs included in one CCE, some REGs cannot be used. Optionally, to avoid REG waste, a total quantity of REGs included in one symbol in the first control resource set is an integer multiple of a total quantity of REGs included in one CCE. In other words, $N_{RB}^{X_p}$ (that is, $N_{RB}^{CORESET}$) is an integer multiple of $N_{REG}^{CCE}$, or $N_{RB}^{X_p}=a \cdot N_{REG}^{CCE}$, where a is a positive integer. In this case, $$\frac{N_{RB}^{X_p}}{N_{REG}^{CCE}}$$

is a positive integer. For example, if a total quantity of REGs in one symbol is 28, $N_{RB}^{X_p}$ is equal to 28, and $N_{REG}^{CCE}$ is equal to 4.

Mapping Manner 6:

When $N_{symb}^{CORESET}$ is equal to 1, each CCE in the first control resource set includes a plurality of REGs discretely (or non-consecutively) distributed in frequency domain. When $N_{symb}^{CORESET}$ is greater than 1, each CCE in the first control resource set includes a plurality of REGs interleaved and discretely (or non-consecutively) distributed in time domain and frequency domain. The mapping manner 6 may be referred to as time-frequency-interleaved distributed/interleaved mapping.

Optionally, the mapping manner information of the first control resource set indicates that the mapping manner of the first control resource set is distributed/interleaved mapping, or time-frequency-interleaved distributed/interleaved mapping.

Optionally, REGs in the first control resource set are numbered in a time-first manner, that is, numbered according to the REG numbering method 1, and REGs in a CCE numbered n in the first control resource set is numbered $$N_{symb}^{COREST} \cdot \left\lfloor \frac{n}{N_{symb}^{CORESET}} \right\rfloor + \quad \text{(Formula 13)}$$

$$(m+n) \bmod N_{symb}^{CORESET} + m \cdot N_{CCE}^{CORESET},$$

where n=0, 1, . . . , $N_{CCE}^{CORESET}-1$, m=0, 1, . . . , $N_{symb}^{CORESET}$ is a quantity of symbols included in the first control resource set. $N_{CCE}^{CORESET}$ is a quantity of CCEs included in the first control resource set, $N_{REG}^{CORESET}$ is a quantity of REGs included in the first control resource set, and $N_{REG}^{CCE}$ is a quantity of REGs included in the CCE numbered n in the first control resource set.

Alternatively. REGs in the first control resource set are numbered in a time-first manner, that is, numbered according to the REG numbering method 1, and REGs in a CCE numbered n in the first control resource set is numbered $$N_{symb}^{COREST} \cdot \left( n \bmod \left( \frac{N_{CCE}^{CORESET}}{N_{symb}^{CORESET}} \right) \right) + \quad \text{(Formula 14)}$$

$$\left( \left\lfloor \frac{n}{\left( \frac{N_{CCE}^{CORESET}}{N_{symb}^{CORESET}} \right)} \right\rfloor + m \right) \bmod N_{symb}^{CORESET} + m \cdot N_{CCE}^{CORESET},$$

where n=0, 1, . . . , $N_{CCE}^{CORESET}-1$, m=0, 1, . . . , $N_{REG}^{CCE}-1$, $N_{symb}^{CORESET}$ is a quantity of symbols included in the first control resource set, $N_{CCE}^{CORESET}$ is a quantity of CCEs included in the first control resource set, $N_{REG}^{CORESET}$ is a quantity of REGs included in the first control resource set, and $N_{REG}^{CCE}$ is a quantity of REGs included in the CCE numbered n in the first control resource set.

The mapping manner 6 in this embodiment of this application is especially applicable to a CRS-based sPDCCH and a DMRS-based NR-PDCCH.

Figure 18:
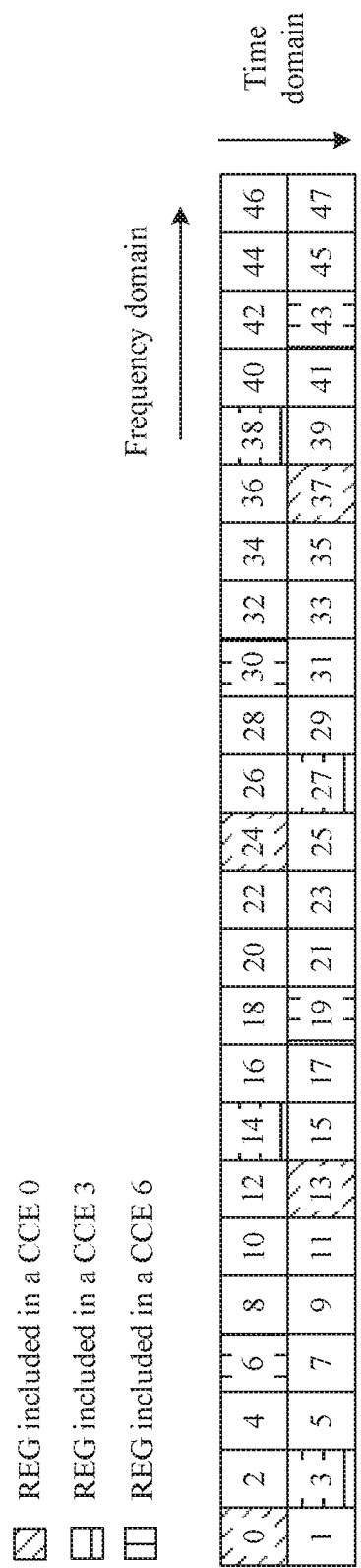
FIG. 18 is a schematic diagram of a mapping manner 6 established based on an REG numbering method 1 according to an embodiment of this application.

For example, FIG. 18 is a schematic diagram of a mapping manner 6 established based on an REG numbering method 1 according to an embodiment of this application. FIG. 18 describes the mapping relationship between the CCE and the REG in the first control resource set by using an example in which the first control resource set occupies two symbols in time domain and each CCE in the first control resource set includes four REGs. For brevity, only REGs included in CCEs numbered 0, 3, and 6 are described. It can be obtained by using the formula 13 that the CCE numbered 0 (denoted as a CCE 0) includes REGs respectively numbered 0, 13, 24, and 37; the CCE numbered 3 (denoted as a CCE 3) includes REGs respectively numbered 3, 14, 27, and 38; and the CCE numbered 6 (denoted as a CCE 6) includes REGs respectively numbered 6, 19, 30, and 43.

Figure 19:
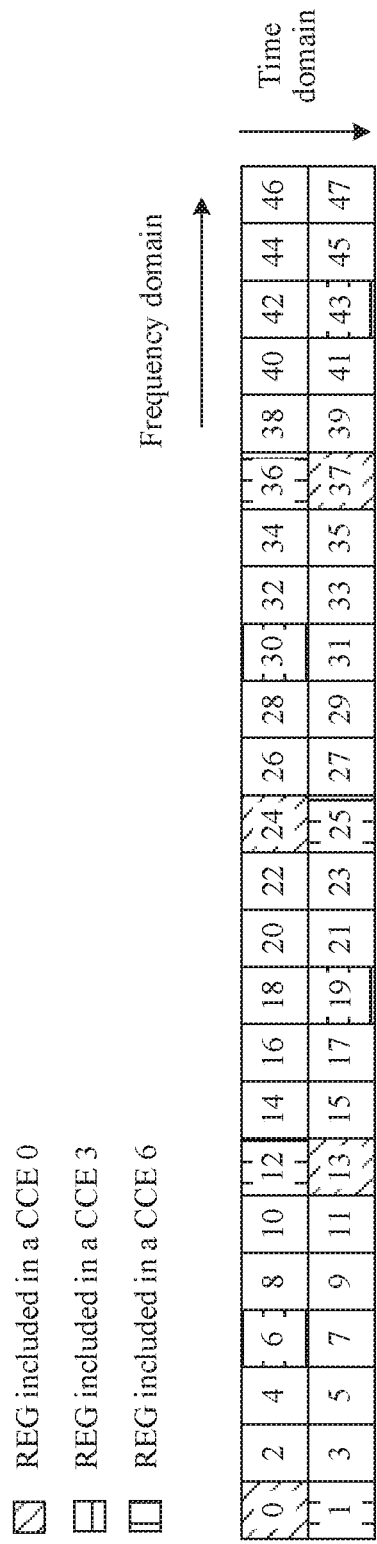
FIG. 19 is a schematic diagram of a mapping manner 6 established based on an REG numbering method 1 according to an embodiment of this application.

For another example, FIG. 19 is a schematic diagram of a mapping manner 6 established based on an REG numbering method 1 according to an embodiment of this application. FIG. 19 describes the mapping relationship between the CCE and the REG in the first control resource set by using an example in which the first control resource set occupies two symbols in time domain and each CCE in the first control resource set includes four REGs. For brevity, only REGs included in CCEs numbered 0, 3, and 6 are described. It can be obtained by using the formula 14 that the CCE numbered 0 (CCE 0) includes REGs respectively numbered 0, 13, 24, and 37; the CCE numbered 3 (CCE 3) includes REGs respectively numbered 6, 19, 30, and 43; and the CCE numbered 6 (CCE 6) includes REGs respectively numbered 1, 12, 25, and 36.

There is a PDCCH and an EPDCCH in a Long Term Evolution (Long Term Evolution, LTE) system. The PDCCH is demodulated based on a CRS, has only one resource mapping manner, and appears only once per millisecond. Therefore, the PDCCH is inapplicable to a low-delay scenario, and the resource mapping manner cannot be used for a PDCCH demodulated based on a DMRS. The EPDCCH is demodulated based on a DMRS, also appears only once per millisecond, and includes more than seven symbols in time domain. Therefore, the EPDCCH is inapplicable to a low-delay scenario. However, the plurality of mapping manners in the embodiments of this application may be randomly combined to form a mapping manner set. In this way, appropriate mapping manners may be selected based on different service transmission requirements. Therefore, according to the communication method in which a target mapping manner is determined by using the mapping manner set in this embodiment of this application, a control resource set and a mapping manner of the control resource set can be configured more flexibly. This helps improve transmission efficiency.

Mapping Manner 7:

The mapping manner information of the first control resource set indicates that the mapping manner of the first control resource set is distributed/interleaved mapping, and REG bundle information in the configuration information of the first control resource set indicates that $N_{REG}^{REG-bundle}$ is equal to $N_{REG}^{CCE}$, for example, indicates that $N_{REG}^{REG-bundle}$ is equal to 6.

In this case, each CCE in the first control resource set includes $N_{REG}^{CCE}$ REGs consecutive in time domain and/or frequency domain, and two consecutively numbered CCEs are located in non-consecutive frequency domain resources.

Optionally, REGs in the first control resource set are numbered in a time-first manner, that is, numbered according to the REG numbering method 2, and numbers of REGs included in one CCE may be obtained by performing two steps: A first step is to determine REGs included in one REG bundle, and a second step is to determine REG bundles included in one CCE.

Specifically, REGs in an REG bundle numbered j in the first control resource set is numbered $m+jN_{REG}^{REG\text{-}bundle}$, where $j=0, 1, \ldots, N_{REG\text{-}bundle}^{CORESET}-1$ or $j=0, 1, \ldots, \lfloor N_{REG}^{CORESET}/N_{REG}^{REG\text{-}bundle}\rfloor$, and $m=0, 1, \ldots, N_{REG}^{REG\text{-}bundle}-1$.

The method for determining the REG bundles included in one CCE in the second step is a method 1 or a method 2:

Method 1: REG bundles included in a CCE numbered n in the first control resource set are determined based on an interleaved row-in-column-out manner of REG bundles. In other words, the REG bundles are written in row by row, and then read out column by column in correspondence with the CCE. An REG bundle is input to the interleaver, and an REG bundle corresponding to the CCE is output.

Method 2: An REG bundle included in a CCE numbered n in the first control resource set is numbered f(n,c), where f(•) is an interleaver (interleaver), $n=0, 1, \ldots, N_{CCE}^{CORESET}-1$, and c is a positive integer greater than 1. For example, c is equal to 2, 3, 4, 6, or 8. For example, the terminal device determines that a value of c is 2, 3, or 6 based on received signaling. Optionally, a value of c indicates a PDCCH aggregation level greater than 1, for example, 2, 4, or 8. For example, if $f(n,c)=\lfloor n/c\rfloor + \lfloor N_{REG\text{-}bundle}^{CORESET}/c\rfloor\cdot(n \bmod c)$, the REG bundle included in the CCE numbered n in the first control resource set is numbered $\lfloor n/c\rfloor + \lfloor N_{REG\text{-}bundle}^{CORESET}/c\rfloor\cdot(n \bmod c)$, where $n=0, 1 \ldots, N_{CCE}^{CORESET}-1$. For example, if the first control resource set includes eight REG bundles, and c is equal to 2, a CCE 0 to a CCE 8 are respectively corresponding to an REG bundle 0, an REG bundle 4, an REG bundle 1, an REG bundle 5, an REG bundle 2, an REG bundle 6, an REG bundle 3, and an REG bundle 7. If c is equal to 4, a CCE 0 to a CCE 8 are respectively corresponding to an REG bundle 0, an REG bundle 2, an REG bundle 4, an REG bundle 6, an REG bundle 1, an REG bundle 3, an REG bundle 5, and an REG bundle 7.

The mapping manner 7 and the localized mapping manner are well compatible. In other words, there is a low probability of PDCCH blocking when the two mapping manners are used. Optionally, when the mapping manner 7 is used, a PDCCH candidate (mentioned in the following) numbered m includes L consecutively numbered CCEs.

Optionally, in an embodiment, the first search space is located in the first control resource set, the first search space includes $M_{p,k}^{(L)}$ PDCCH candidates with an aggregation level L, a PDCCH candidate numbered m is one of the $M_{p,k}^{(L)}$ PDCCH candidates with the aggregation level L, and the terminal device determines, based on the mapping manner information of the first control resource set, L CCEs included in the PDCCH candidate numbered m in the first search space.

The mapping manner information of the first control resource set indicates that the mapping manner of the first control resource set is localized/non-interleaved mapping, and L CCEs included in the PDCCH candidate numbered m are consecutive in time domain and/or frequency domain, or the L CCEs are consecutively numbered.

Optionally, in an embodiment, the mapping manner information of the first control resource set indicates that the mapping manner of the first control resource set is distributed/interleaved mapping, and if L is equal to 2, the PDCCH candidate numbered m includes two consecutively numbered CCEs; or if L is greater than 2, the PDCCH candidate numbered m includes L CCEs, and at least two CCEs in the L CCEs are numbered non-consecutively.

Optionally, the mapping manner of the first control resource set is time-first distributed/interleaved mapping, the CCE-to-REG mapping manner is the mapping manner 4, and during a transmission duration k, a CCE included in the PDCCH candidate numbered m in a first search space $S_k^{(L)}$ with an aggregation level L is numbered $$L\{(Y_{p,k}^L + m') \bmod \lfloor N_{CCE,p,k}/L\rfloor\} + \left\lfloor\frac{i}{2}\right\rfloor\cdot\left\lfloor\frac{N_{CCE,p,k}}{\frac{L}{2}}\right\rfloor + i \bmod 2,$$

where $i=0, \ldots, L-1$, $N_{CCE,p,k}$ indicates a total quantity of CCEs included in the first control resource set (which may be denoted by p) during the transmission duration k, $Y_{p,k}^L$ indicates a number of a start CCE in the first search space during the transmission duration k, $m'=m+M^{(L)}\cdot n_{CI}$, $n_{CI}$ indicates a carrier identifier, $m=0, 1, \ldots, M_p^{(L)}-1$, and $M_p^{(L)}$ is a quantity of PDCCH candidates with an aggregation level L in the first search space.

It should be noted that the number $Y_{p,k}^L$ of the start CCE in the first search space during the transmission duration k may be configured by the network device, and then notified to the terminal device by using high-layer signaling.

Optionally, in an embodiment, the mapping manner of the first control resource set is frequency-first distributed mapping (also referred to as interleaved mapping), and the CCE-to-REG mapping manner is the mapping manner 5. During a transmission duration k, a CCE included in the PDCCH candidate numbered m in a first search space $S_k^{(L)}$ with an aggregation level L is numbered as follows:

$$L\{(Y_{p,k}^L + m') \bmod \lfloor N_{CCE,p,k}/L\rfloor\} + \left\lfloor\frac{i}{2}\right\rfloor\cdot\left\lfloor\frac{N_{CCE,p,k}/N_{symb}^{CORESET}}{\frac{L}{2}}\right\rfloor + i \bmod 2$$

if $N_{CCE,p,k}/N_{symb}^{CORESET} \geq L$; or $$L\{(Y_{p,k}^L + m') \bmod \lfloor N_{CCE,p,k}/L\rfloor\} + \left\lfloor\frac{i}{2}\right\rfloor\cdot\left\lfloor\frac{N_{CCE,p,k}}{\frac{L}{2}}\right\rfloor + i \bmod 2$$

if $N_{CCE,p,k}/N_{symb}^{CORESET} < L$, where $i=0, \ldots, L-1$, $N_{CCE,p,k}$ is a quantity of CCEs included in the first control resource set (which may be denoted by p) during the transmission duration k, $Y_{p,k}^L$ is a number of a start CCE in the first search space during the transmission duration k, and $N_{symb}^{CORESET}$ is a quantity of symbols included in the first control resource set.

It should be noted that the number $Y_{p,k}^L$ of the start CCE in the first search space during the transmission duration k may be configured by the network device, and then notified to the terminal device by using high-layer signaling.

Optionally, in an embodiment, a first PDCCH is transmitted in a first CCE and a second CCE in the first control resource set, mapping manners of the first CCE and the second CCE in the first control resource set are distributed mapping, a first REG in the first CCE and a second REG in the second CCE are consecutive in frequency domain, a number of the first REG and a number of the second REG are adjacent numbers, and the first CCE and the second CCE belong to the first search space. The method further includes:

performing, by the terminal device in the first search space, blind detection on the first PDCCH.

Figure 20:
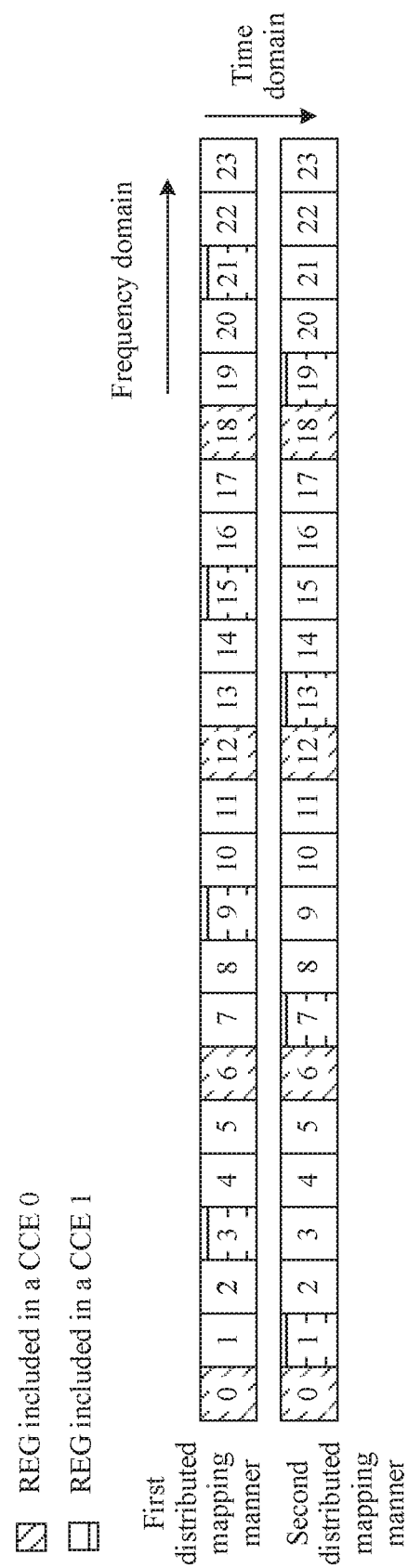
FIG. 20 is a schematic diagram of two distributed CCE-to-REG mapping manners according to an embodiment of this application.

For example, FIG. 20 is a schematic diagram of two distributed CCE-to-REG mapping manners according to an embodiment of this application. FIG. 20 describes two types of distributed mapping merely by using an example in which an aggregation level of a PDCCH is 2. It can be learned from FIG. 20 that if four REGs are included in each CCE in the first control resource set, in a first distributed mapping manner, a CCE numbered 0 (denoted as a CCE 0) includes REGs numbered 0, 6, 12, and 18, a CCE numbered 1 (denoted as a CCE 1) includes REGs numbered 3, 9, 15, and 21, and other PDCCHs cannot be transmitted by using an unoccupied REG. However, in a second distributed mapping manner, a CCE 0 may include REGs numbered 0, 6, 12, and 18, and a CCE 1 includes REGs numbered 1, 7, 13, and 19. It can be learned that unoccupied REGs numbered 2, 3, 4, and 5 may form a CCE to transmit other PDCCHs. Therefore, the second distributed mapping can improve resource usage as compared with the first distributed mapping.

Optionally, in an embodiment, a CCE mapping manner in the first control resource set is distributed mapping, a second PDCCH is transmitted in L CCEs in the first control resource set, L>2, the L CCEs include at least one REG set, the REG set includes a third REG and a fourth REG that are adjacently numbered, the third REG and the fourth REG are consecutive in frequency domain, the third REG and the fourth REG respectively belong to two adjacently numbered CCEs, the L CCEs include at least two sets of REGs that are non-consecutive in frequency domain, and the L CCEs belong to a second search space. The method further includes: performing, by the terminal device in the second search space, blind detection on the second PDCCH.

Figure 21:
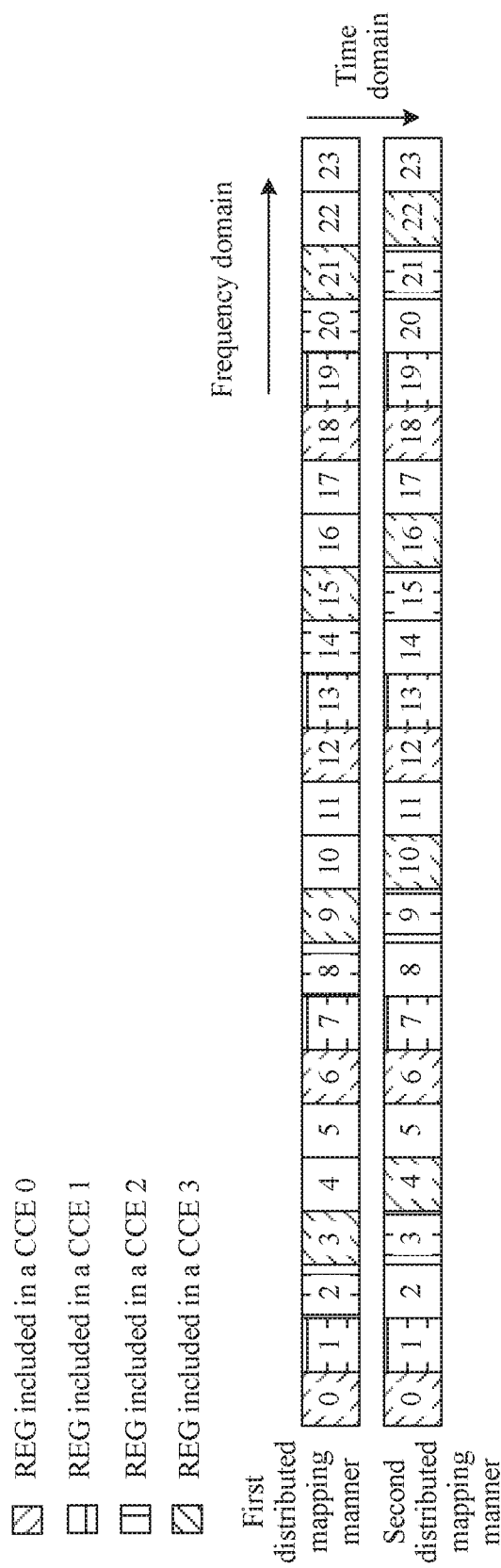
FIG. 21 is a schematic diagram of two distributed CCE-to-REG mapping manners according to an embodiment of this application.

For example, FIG. 21 is a schematic diagram of two distributed CCE-to-REG mapping manners according to an embodiment of this application. FIG. 21 describes the two types of distributed mapping merely by using an example in which an aggregation level of a PDCCH is 4. It can be learned from FIG. 21 that if four REGs are included in each CCE in the first control resource set, in a first distributed mapping manner, frequencies occupied by REGs in four CCEs transmitting a PDCCH are densely distributed in frequency domain. However, in a second distributed mapping manner, it can be learned that frequencies occupied by REGs in four CCEs transmitting a PDCCH are discretely distributed in frequency domain. Therefore, the second distributed mapping helps improve signal transmission quality as compared with the first distributed mapping.

The network device may configure one or more search spaces for one terminal device. Certainly, the network device may also configure a same search space or a plurality of different search spaces for a plurality of terminal devices served by the network device. Different mapping manners may be used for CCEs included in the plurality of search spaces configured for one terminal device. Different mapping manners may also be used for CCEs included in the plurality of search spaces configured for the plurality of terminal devices. In addition, regardless of the plurality of search spaces for one terminal device or the plurality of search spaces for the plurality of terminal devices, the network device may configure partially or fully overlapped time-frequency resources in the plurality of search spaces. In this case, coexistence of the plurality of search spaces when different CCE mapping manners are used needs to be considered. For example, how to reduce a PDCCH blocking (blocking) probability needs to be considered. In this embodiment of this application, when L is equal to 2, blocking between a localized mapping manner and a distributed mapping manner can be reduced. However, for an aggregation level greater than 2, to improve PDCCH receiving performance, a larger frequency domain diversity gain is needed, and this solution can be used to achieve the purpose. In addition, considering a relatively low occurrence probability of a PDCCH with a high aggregation level, the impact is small.

The foregoing has described in detail the communication methods according to the embodiments of this application with reference to FIG. 1 to FIG. 21. The following describes in detail apparatuses according to embodiments of this application with reference to FIG. 22 to FIG. 25. It should be understood that the apparatuses shown in FIG. 22 to FIG. 25 can perform the steps in FIG. 6. In other words, the devices can perform all the methods in the foregoing embodiments. Therefore, for specific details of the devices, refer to the descriptions in the foregoing embodiments. To avoid repetition, details are not described herein again.

Figure 22:
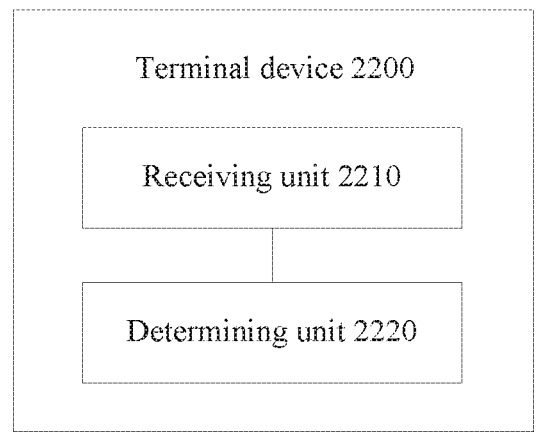
FIG. 22 is a schematic block diagram of a terminal device according to an embodiment of this application.

FIG. 22 is a schematic block diagram of a terminal device according to an embodiment of this application. A terminal device 2200 shown in FIG. 22 includes a receiving unit 2210 and a determining unit 2220.

The receiving unit 2210 is configured to receive configuration information of a first control resource set, where the configuration information of the first control resource set includes mapping manner information of the first control resource set.

The determining unit 2220 is configured to determine based on the mapping manner information of the first control resource set that is received by the receiving unit, a mapping manner between a control channel element CCE and resource element groups REGs in the first control resource set, where a REG in the first control resource set occupies one symbol in time domain and occupies one resource block RB in frequency domain.

Optionally, in an embodiment, the mapping manner information of the first control resource set indicates that the mapping manner of the first control resource set is localized mapping, each CCE in the first control resource set includes a plurality of REGs consecutive in frequency domain, and the plurality of REGs included in each CCE are located in a same symbol.

Optionally, in an embodiment, REGs in a CCE numbered n in the first control resource set is numbered $$m \cdot N_{symb}^{CORESET} + n \bmod N_{symb}^{CORESET} + \left\lfloor \frac{n}{N_{symb}^{CORESET}} \right\rfloor \cdot N_{REG}^{CCE} \cdot N_{symb}^{CORESET},$$

REGs in a CCE numbered n in the first control resource set is numbered $$m + (n \bmod N_{symb}^{CORESET}) \cdot N_{RB}^{CORESET} + \left\lfloor \frac{n}{N_{symb}^{CORESET}} \right\rfloor \cdot N_{REG}^{CCE},$$

a CCE numbered n in the first control resource set contains REGs numbered $$m + \left\lfloor \frac{n}{N_{symb}^{CORESET}} \right\rfloor \cdot N_{REG}^{CCE}$$

and located in a symbol numbered n mod $N_{symb}^{CORESET}$, where m=0, 1, ..., $N_{REG}^{CCE}-1$, n=0, 1, ..., $N_{symb}^{CORESET}$ is a quantity of symbols included in the first control resource set, $N_{REG}^{CCE}$ is a quantity of REGs included in the CCE numbered n in the first control resource set, and $N_{CCE}^{CORESET}$ is a quantity of CCEs included in the first control resource set.

Optionally, in an embodiment, the mapping manner information of the first control resource set indicates that the mapping manner of the first control resource set is time-first localized mapping, REGs in the first control resource set are numbered in a time-first manner, and REGs in a CCE numbered n in the first control resource set is numbered $m+nN_{REG}^{CCE}$, where m=0, 1, ..., $N_{REG}^{CCE}-1$, n=0, 1, ..., $N_{CCE}^{CORESET}-1$, $N_{REG}^{CCE}$ is a quantity of REGs included in the CCE numbered n in the first control resource set, and $N_{CCE}^{CORESET}$ is a quantity of CCEs included in the first control resource set.

Optionally, in an embodiment, the mapping manner information of the first control resource set indicates that the mapping manner of the first control resource set is frequency-first localized mapping, REGs in the first control resource set are numbered in a frequency-first manner, and REGs in a CCE numbered n in the first control resource set is numbered $m+nN_{REG}^{CCE}$, where m=0, 1, ..., $N_{REG}^{CCE}-1$, n=0, 1, ..., $N_{CCE}^{CORESET}-1$, $N_{REG}^{CCE}$ is a quantity of REGs included in the CCE numbered n in the first control resource set, and $N_{CCE}^{CORESET}$ is a quantity of CCEs included in the first control resource set.

Optionally, in an embodiment, the mapping manner information of the first control resource set indicates that the mapping manner of the first control resource set is time-first distributed mapping, REGs in the first control resource set are numbered in a time-first manner, and REGs in a CCE numbered n in the first control resource set is numbered $$l + n \cdot N_{symb}^{CORESET} + j \cdot \left\lfloor \frac{N_{REG}^{CORESET}}{\frac{N_{REG}^{CCE}}{N_{symb}^{CORESET}}} \right\rfloor,$$

where l=0, 1, ..., $N_{symb}^{CORESET}-1$, n=0, 1, ..., $N_{CCE}^{CORESET}-1$, $$j = 0, 1, \ldots, \frac{N_{REG}^{CCE}}{N_{symb}^{CORESET}} - 1,$$

$N_{symb}^{CORESET}$ is a quantity of symbols included in the first control resource set, $N_{REG}^{CORESET}$ is a quantity of REGs included in the first control resource set, $N_{REG}^{CCE}$ is a quantity of REGs included in the CCE numbered n in the first control resource set, and $N_{CCE}^{CORESET}$ is a quantity of CCEs included in the first control resource set.

Optionally, in an embodiment, REGs in a CCE numbered n in the first control resource set is numbered $$N_{symb}^{CORESET} \cdot \left( n \mod \left( \frac{N_{CCE}^{CORESET}}{N_{symb}^{CORESET}} \right) \right) + \left\lfloor \frac{n}{\left\lceil \frac{N_{CCE}^{CORESET}}{N_{symb}^{CORESET}} \right\rceil} \right\rfloor + m \cdot \left\lfloor \frac{N_{REG}^{CORESET}}{N_{REG}^{CCE}} \right\rfloor,$$

or

REGs in a CCE numbered n in the first control resource set is numbered $$n \mod \left( \frac{N_{CCE}^{CORESET}}{N_{symb}^{CORESET}} \right) + \left\lfloor \frac{n}{\left\lceil \frac{N_{CCE}^{CORESET}}{N_{symb}^{CORESET}} \right\rceil} \right\rfloor \cdot N_{RB}^{CORESET} + m \cdot \left\lfloor \frac{N_{RB}^{CORESET}}{N_{REG}^{CCE}} \right\rfloor,$$

or a CCE numbered n in the first control resource set contains REGs numbered $$n \mod \left( \frac{N_{CCE}^{CORESET}}{N_{symb}^{CORESET}} \right) + m \cdot \left\lfloor \frac{N_{RB}^{CORESET}}{N_{REG}^{CCE}} \right\rfloor$$

and located in a symbol numbered $$\left\lfloor \frac{n}{\left\lceil \frac{N_{CCE}^{CORESET}}{N_{symb}^{CORESET}} \right\rceil} \right\rfloor,$$

where n=0, 1, ..., $N_{CCE}^{CORESET}-1$, m=0, 1, ..., $N_{REG}^{CCE}-1$, $N_{symb}^{CORESET}$ a quantity of symbols included in the first control resource set, $N_{CCE}^{CORESET}$ is a quantity of CCEs included in the first control resource set, $N_{REG}^{CORESET}$ is a quantity of REGs included in the first control resource set, and $N_{REG}^{CCE}$ is a quantity of REGs included in the CCE numbered n in the first control resource set.

Optionally, in an embodiment, the mapping manner information of the first control resource set indicates that the mapping manner of the first control resource set is time-frequency-interleaved distributed mapping, REGs in the first control resource set are numbered in a time-first manner, and REGs in a CCE numbered n in the first control resource set is numbered $$N_{symb}^{CORESET} \cdot \left\lfloor \frac{n}{N_{symb}^{CORESET}} \right\rfloor + (m+n) \mod N_{symb}^{CORESET} + m \cdot \left\lfloor \frac{N_{REG}^{CORESET}}{N_{REG}^{CCE}} \right\rfloor,$$

REGs in a CCE numbered n in the first control resource set is numbered $$N_{symb}^{CORESET} \cdot \left( n \mod \left( \frac{N_{CCE}^{CORESET}}{N_{symb}^{CORESET}} \right) \right) + \left( \left\lfloor \frac{n}{\left\lceil \frac{N_{CCE}^{CORESET}}{N_{symb}^{CORESET}} \right\rceil} \right\rfloor + m \right) \mod N_{symb}^{CORESET} + m \cdot \left\lfloor \frac{N_{REG}^{CORESET}}{N_{REG}^{CCE}} \right\rfloor,$$

where n=0, 1, ..., $N_{CCE}^{CORESET}-1$, m=0, 1, ..., $N_{REG}^{CCE}-1$, $N_{symb}^{CORESET}$ is a quantity of symbols included in the first control resource set, $N_{CCE}^{CORESET}$ is a quantity of CCEs included in the first control resource set, $N_{REG}^{CORESET}$ is a quantity of REGs included in the first control resource set, and $N_{REG}^{CCE}$ is a quantity of REGs included in the CCE numbered n in the first control resource set.

Optionally, in an embodiment, the first search space is located in the first control resource set, the first search space includes $M_{p,k}^{(L)}$ physical downlink control channel PDCCH candidates with an aggregation level L, and a PDCCH candidate numbered m is one of the $M_{p,k}^{(L)}$, PDCCH candidates with the aggregation level L.

The determining unit is further configured to determine, based on the mapping manner information of the first control resource set, L CCEs included in the PDCCH candidate numbered m in the first search space.

Optionally, in an embodiment, the mapping manner information of the first control resource set indicates that the mapping manner of the first control resource set is distributed mapping, and if L is equal to 2, the PDCCH candidate numbered m includes two consecutively numbered CCEs; or if L is greater than 2, the PDCCH candidate numbered m includes L CCEs, and at least two of the L CCEs are numbered non-consecutively.

In an optional embodiment, the receiving unit 2210 may be a transceiver 2340, the determining unit 2220 may be a processor 2320, and the terminal device may further include an input/output interface 2330 and a memory 2310. Details are shown in FIG. 23.

Figure 23:
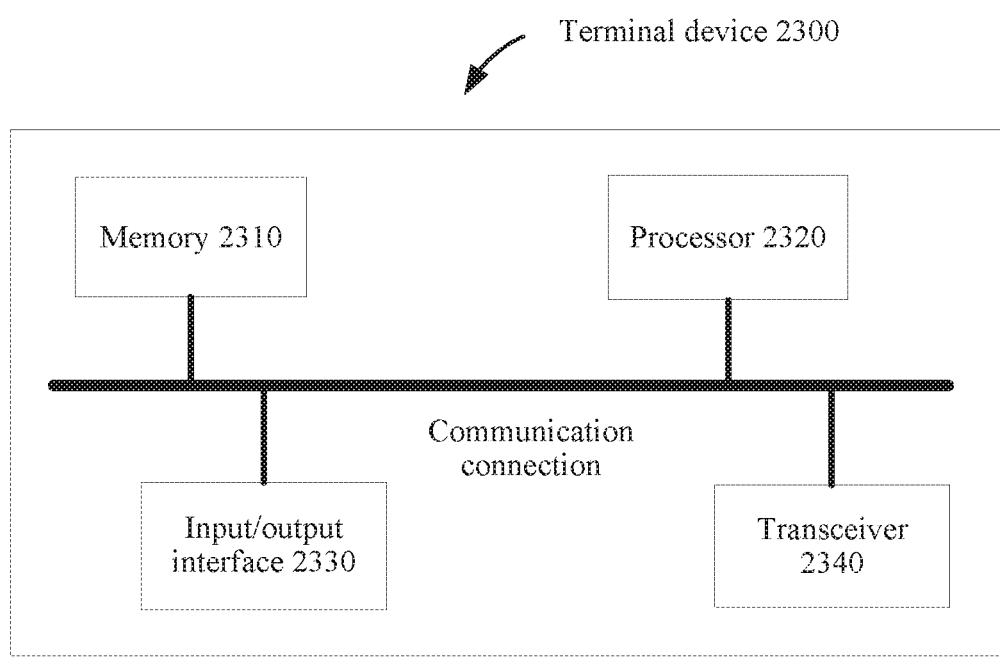
FIG. 23 is a schematic block diagram of a terminal device according to another embodiment of this application.

FIG. 23 is a schematic block diagram of a terminal device according to another embodiment of this application. The terminal device can perform all the methods in the foregoing embodiments. Therefore, for specific details of the terminal device, refer to the descriptions in the foregoing embodiments. To avoid repetition, details are not described herein again. A terminal device 2300 shown in FIG. 23 may include a memory 2310, a processor 2320, an input/output interface 2330, and a transceiver 2340. The memory 2310, the processor 2320, the input/output interface 2330, and the transceiver 2340 are connected by using an internal connecting path. The memory 2310 is configured to store an instruction. The processor 2320 is configured to execute the instruction stored in the memory 2320, to control the input/output interface 2330 to receive input data and information, and output data such as an operation result, and control the transceiver 2340 to send a signal.

The transceiver 2340 is configured to receive configuration information of a first control resource set, where the configuration information of the first control resource set includes mapping manner information of the first control resource set.

The processor 2320 is configured to determine based on the mapping manner information of the first control resource set that is received by the transceiver, a mapping manner between a control channel element CCE and resource element groups REGs in the first control resource set, where a REG in the first control resource set occupies one symbol in time domain and occupies one resource block RB in frequency domain.

It should be understood that in this embodiment of this application, the processor 2320 may be a general-purpose central processing unit (Central Processing Unit, CPU), a microprocessor, an application-specific integrated circuit (Application Specific Integrated Circuit, ASIC), or one or more integrated circuits, to execute a related program to implement the technical solutions provided in the embodiments of this application.

It should be further understood that the transceiver 2340 is also referred to as a communications interface, and uses a transceiver apparatus, for example, including but not limited to a transceiver, to implement communication between the terminal device 2300 and another device or a communications network.

The memory 2310 may include a read-only memory and a random access memory, and provides an instruction and data for the processor 2320. A part of the processor 2320 may further include a non-volatile random access memory. For example, the processor 2320 may further store device type information.

In an implementation process, steps of the foregoing method may be performed by an integrated logical circuit in a form of hardware or by an instruction in a form of software in the processor 2320. The communication methods disclosed with reference to the embodiments of this application may be directly performed and completed by using a hardware processor, or may be performed and completed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory 2310. The processor 2320 reads information from the memory 2310 and performs, with hardware thereof, the steps in the foregoing method. To avoid repetition, details are not described herein again.

It should be understood that in the embodiments of this application, the processor may be a central processing unit (central processing unit, CPU). Alternatively, the processor may be another general-purpose processor, a digital signal processor (digital signal processor. DSP), an application-specific integrated circuit (application specific integrated circuit, ASIC), a field programmable gate array (field programmable gate array, FPGA), or another programmable logic device, a discrete gate, a transistor logic device, a discrete hardware component, or the like. The general purpose processor may be a microprocessor, or the processor may be any conventional processor or the like.

Figure 24:
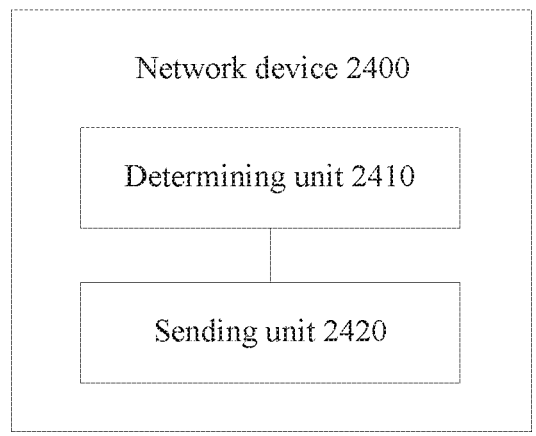
FIG. 24 is a schematic structural diagram of a network device according to an embodiment of this application.

FIG. 24 is a schematic structural diagram of a network device according to an embodiment of this application. The network device can perform all the methods in the foregoing embodiments. Therefore, for specific details of the network device, refer to the descriptions in the foregoing embodiments. To avoid repetition, details are not described herein again. The network device 2400 shown in FIG. 24 includes a determining unit 2410 and a sending unit 2420.

The determining unit is configured to determine a mapping manner of between a control channel element CCE in a first control resource set and a resource element group REG in the first control resource set, where a REG in the first control resource set occupies one symbol in time domain and occupies one resource block RB in frequency domain.

The sending unit is configured to send configuration information of the first control resource set, where the configuration information of the first control resource set includes mapping manner information of the first control resource set, and the mapping manner information of the first control resource set indicates the mapping manner between the CCE and the REGs in the first control resource set.

Optionally, in an embodiment, the mapping manner information of the first control resource set indicates that the mapping manner of the first control resource set is localized mapping, each CCE in the first control resource set includes a plurality of REGs consecutive in frequency domain, and the plurality of REGs included in each CCE are located in a same symbol.

Optionally, in an embodiment, REGs in a CCE numbered n in the first control resource set is numbered $$m \cdot N_{symb}^{CORESET} + n \bmod N_{symb}^{CORESET} + \left\lfloor \frac{n}{N_{symb}^{CORESET}} \right\rfloor \cdot N_{REG}^{CCE} \cdot N_{symb}^{CORESET},$$

REGs in a CCE numbered n in the first control resource set is numbered $$m + (n \bmod N_{symb}^{CORESET}) \cdot N_{RB}^{CORESET} + \left\lfloor \frac{n}{N_{symb}^{CORESET}} \right\rfloor \cdot N_{REG}^{CCE},$$

a CCE numbered n in the first control resource set contains REGs numbered $$m + \left\lfloor \frac{n}{N_{symb}^{CORESET}} \right\rfloor \cdot N_{REG}^{CCE}$$

and located in a symbol numbered $n \bmod N_{symb}^{CORESET}$.

where $m=0, 1, \ldots, N_{REG}^{CCE}-1$, $n=0, 1, \ldots, N_{CCE}^{CORESET}-1$, $N_{symb}^{CORESET}$ is a quantity of symbols included in the first control resource set, $N_{REG}^{CCE}$ is a quantity of REGs included in the CCE numbered n in the first control resource set, and $N_{CCE}^{CORESET}$ is a quantity of CCEs included in the first control resource set.

Optionally, in an embodiment, the mapping manner information of the first control resource set indicates that the mapping manner of the first control resource set is time-first localized mapping, REGs in the first control resource set are numbered in a time-first-frequency-second manner, and REGs in a CCE numbered n in the first control resource set is numbered $m+nN_{REG}^{CCE}$, where $m=0, 1, \ldots, N_{REG}^{CCE}-1$ $n=0, 1, \ldots, N_{CCE}^{CORESET}-1$, $N_{REG}^{CCE}$ is a quantity of REGs included in the CCE numbered n in the first control resource set, and $N_{CCE}^{CORESET}$ is a quantity of CCEs included in the first control resource set.

Optionally, in an embodiment, the mapping manner information of the first control resource set indicates that the mapping manner of the first control resource set is frequency-first localized mapping, REGs in the first control resource set are numbered in a frequency-first-time-second manner, and REGs in a CCE numbered n in the first control resource set is numbered $m+nN_{REG}^{CCE}$, where $m=0, 1, \ldots, N_{REG}^{CCE}-1$, $n=0, 1, \ldots, N_{CCE}^{CORESET}-1$, $N_{REG}^{CCE}$ is a quantity of REGs included in the CCE numbered n in the first control resource set, and $N_{CCE}^{CORESET}$ is a quantity of CCEs included in the first control resource set.

Optionally, in an embodiment, the mapping manner information of the first control resource set indicates that the mapping manner of the first control resource set is time-first distributed mapping, REGs in the first control resource set are numbered in a time-first-frequency-second manner, and REGs in a CCE numbered n in the first control resource set is numbered $$l + n \cdot N_{symb}^{CORESET} + j \cdot \left\lfloor \frac{N_{REG}^{CORESET}}{\left(\frac{N_{REG}^{CCE}}{N_{symb}^{CORESET}}\right)} \right\rfloor,$$

where $l=0, 1, \ldots, N_{symb}^{CORESET}-1$, $n=0, 1, \ldots, N_{CCE}^{CORESET}-1$, $$j = 0, 1, \ldots, \frac{N_{REG}^{CCE}}{N_{symb}^{CORESET}} - 1,$$

$N_{symb}^{CORESET}$ is a quantity of symbols included in the first control resource set, $N_{REG}^{CORESET}$ is a quantity of REGs included in the first control resource set, $N_{REG}^{CCE}$ is a quantity of REGs included in the CCE numbered n in the first control resource set, and $N_{CCE}^{CORESET}$ is a quantity of CCEs included in the first control resource set.

Optionally, in an embodiment, REGs in a CCE numbered n in the first control resource set is numbered $$N_{symb}^{CORESET} \cdot \left(n \bmod \left(\frac{N_{CCE}^{CORESET}}{N_{symb}^{CORESET}}\right)\right) + \left\lfloor \frac{n}{\left(\frac{N_{CCE}^{CORESET}}{N_{symb}^{CORESET}}\right)} \right\rfloor + m \cdot \left\lfloor \frac{N_{REG}^{CORESET}}{N_{REG}^{CCE}} \right\rfloor,$$

REGs in a CCE numbered n in the first control resource set is numbered $$n \bmod \left(\frac{N_{CCE}^{CORESET}}{N_{symb}^{CORESET}}\right) + \left\lfloor \frac{n}{\left(\frac{N_{CCE}^{CORESET}}{N_{symb}^{CORESET}}\right)} \right\rfloor \cdot N_{RB}^{CORESET} + m \cdot \left\lfloor \frac{N_{RB}^{CORESET}}{N_{REG}^{CCE}} \right\rfloor,$$

a CCE numbered n in the first control resource set contains REGs numbered $$n \bmod \left(\frac{N_{CCE}^{CORESET}}{N_{symb}^{CORESET}}\right) + m \cdot \left\lfloor \frac{N_{RB}^{CORESET}}{N_{REG}^{CCE}} \right\rfloor$$

and located in a symbol numbered $$\left\lfloor \frac{n}{\left(\frac{N_{CCE}^{CORESET}}{N_{symb}^{CORESET}}\right)} \right\rfloor,$$

where $n=0, 1, \ldots, N_{CCE}^{CORESET}-1$, $m=0, 1, \ldots, N_{REG}^{CCE}-1$, $N_{symb}^{CORESET}$ a quantity of symbols included in the first control resource set, $N_{CCE}^{CORESET}$ is a quantity of CCEs included in the first control resource set, $N_{REG}^{CORESET}$ is a quantity of REGs included in the first control resource set, and $N_{REG}^{CCE}$ is a quantity of REGs included in the CCE numbered n in the first control resource set.

Optionally, in an embodiment, the mapping manner information of the first control resource set indicates that the mapping manner of the first control resource set is time-frequency-interleaved distributed mapping, REGs in the first control resource set are numbered in a time-first manner, and REGs in a CCE numbered n in the first control resource set is numbered $$N_{symb}^{CORESET} \cdot \left\lfloor \frac{n}{N_{symb}^{CORESET}} \right\rfloor + (m+n) \bmod N_{symb}^{CORESET} + m \cdot \left\lfloor \frac{N_{REG}^{CORESET}}{N_{REG}^{CCE}} \right\rfloor,$$

REGs in a CCE numbered n in the first control resource set is numbered $$N_{symb}^{CORESET} \cdot \left( n \bmod \left( \frac{N_{CCE}^{CORESET}}{N_{symb}^{CORESET}} \right) \right) + \left( \left( \left\lfloor \frac{n}{\left\lfloor \frac{N_{CCE}^{CORESET}}{N_{symb}^{CORESET}} \right\rfloor} \right\rfloor + m \right) \bmod N_{symb}^{CORESET} + m \cdot \left\lfloor \frac{N_{REG}^{CORESET}}{N_{REG}^{CCE}} \right\rfloor \right),$$

where n=0, 1, . . . , $N_{CCE}^{CORESET}$−1, m=0, 1, . . . , $N_{REG}^{CCE}$−1, $N_{symb}^{CORESET}$ is a quantity of symbols included in the first control resource set. $N_{CCE}^{CORESET}$ is a quantity of CCEs included in the first control resource set, $N_{REG}^{CORESET}$ is a quantity of REGs included in the first control resource set, and $N_{REG}^{CCE}$ is a quantity of REGs included in the CCE numbered n in the first control resource set.

Optionally, in an embodiment, the first search space is located in the first control resource set, the first search space includes $M_{p,k}^{(L)}$ PDCCH candidates with an aggregation level L, a PDCCH candidate numbered m is one of the $M_{p,k}^{(L)}$ PDCCH candidates with the aggregation level L, and the mapping manner information of the first control resource set indicates L CCEs included in the PDCCH candidate numbered m in the first search space.

Optionally, in an embodiment, the mapping manner information of the first control resource set indicates that the mapping manner of the first control resource set is distributed mapping, and if L is equal to 2, the PDCCH candidate numbered m includes two consecutively numbered CCEs; or if L is greater than 2, the PDCCH candidate numbered m includes L CCEs, and at least two of the L CCEs are numbered non-consecutively.

In an optional embodiment, the determining unit 2410 may be a processor 2520, the sending unit 2420 may be a transceiver 2540, and the network device may further include an input/output interface 2530 and a memory 2510. Details are shown in FIG. 25.

Figure 25:
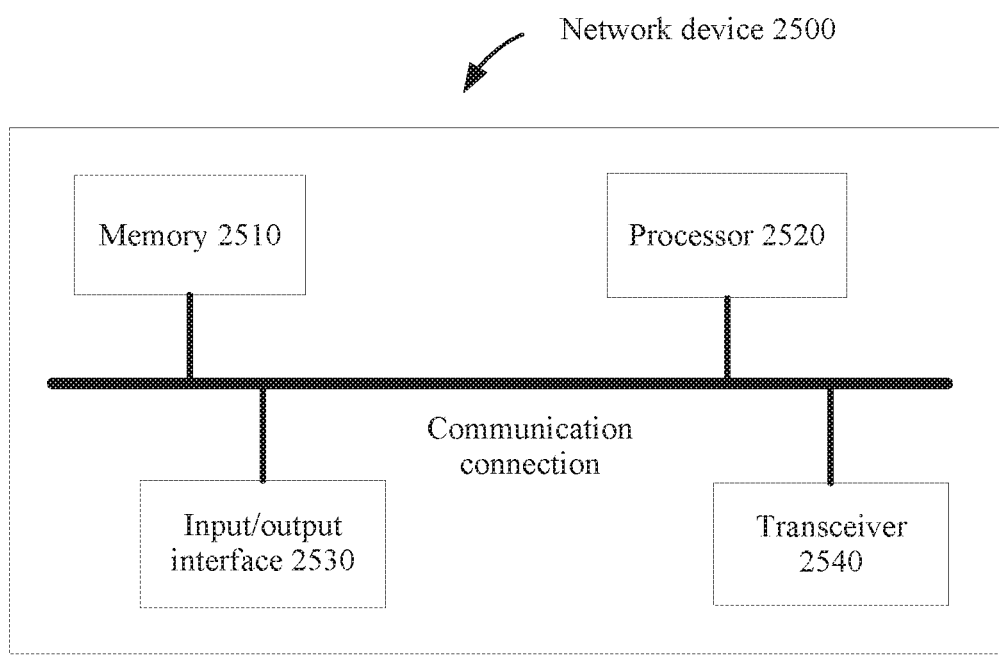
FIG. 25 is a schematic block diagram of a network device according to another embodiment of this application.

FIG. 25 is a schematic block diagram of a network device according to another embodiment of this application. A network device 2500 shown in FIG. 25 may include a memory 2510, a processor 2520, an input/output interface 2530, and a transceiver 2540. The memory 2510, the processor 2520, the input/output interface 2530, and the transceiver 2540 are connected by using an internal connecting path. The memory 2510 is configured to store an instruction. The processor 2520 is configured to execute the instruction stored in the memory 2520, to control the input/output interface 2530 to receive input data and information, and output data such as an operation result, and control the transceiver 2540 to send a signal.

The processor 2520 is configured to determine a mapping manner between a control channel element CCE in a first control resource set and resource element groups REGs in the first control resource set, where a REG in the first control resource set occupies one symbol in time domain and occupies one resource block RB in frequency domain.

The transceiver 2540 is configured to determine a mapping manner between a control channel element CCE in a first control resource set and resource element groups REGs in the first control resource set, where a REG in the first control resource set occupies one symbol in time domain and occupies one resource block RB in frequency domain.

It should be understood that in this embodiment of this application, the processor 2520 may be a general-purpose central processing unit (Central Processing Unit, CPU), a microprocessor, an application-specific integrated circuit (Application Specific Integrated Circuit, ASIC), or one or more integrated circuits, to execute a related program to implement the technical solutions provided in the embodiments of this application.

It should be further understood that the transceiver 2540 is also referred to as a communications interface, and uses a transceiver apparatus, for example, including but not limited to a transceiver, to implement communication between the network device 2500 and another device or a communications network.

The memory 2510 may include a read-only memory and a random access memory, and provides an instruction and data for the processor 2520. A part of the processor 2520 may further include a non-volatile random access memory. For example, the processor 2520 may further store device type information.

In an implementation process, steps of the foregoing method may be performed by an integrated logical circuit in a form of hardware or by an instruction in a form of software in the processor 2520. The communication methods disclosed with reference to the embodiments of this application may be directly performed and completed by using a hardware processor, or may be performed and completed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory 2510. The processor 2520 reads information from the memory 2510 and performs, with hardware thereof, the steps in the foregoing method. To avoid repetition, details are not described herein again.

It should be understood that in the embodiments of this application, the processor may be a central processing unit (central processing unit. CPU). Alternatively, the processor may be another general-purpose processor, a digital signal processor (digital signal processor, DSP), an application-specific integrated circuit (application specific integrated circuit, ASIC), a field programmable gate array (field programmable gate array, FPGA), or another programmable logic device, a discrete gate, a transistor logic device, a discrete hardware component, or the like. The general purpose processor may be a microprocessor, or the processor may be any conventional processor or the like.

It may be further understood that the memory in the embodiments of this application may be a volatile memory or a non-volatile memory, or may include a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM. EEPROM), or a flash memory. The volatile memory may be a random access memory (random access memory, RAM), used as an external cache. Through examples but not limitative description, many forms of random access memories (random access memory, RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct Rambus dynamic random access memory (direct Rambus RAM, DR RAM).

All or some of the foregoing embodiments may be implemented by using software, hardware, firmware, or any combination thereof. When software is used to implement the embodiments, the foregoing embodiments may be implemented fully or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

The term "and/or" in this specification describes only an association relationship for describing associated objects and represents that three relationships may exist. For example. A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A communication method, comprising:
receiving, by a terminal device, configuration information of a first control resource set, wherein the configuration information of the first control resource set comprises mapping manner information of the first control resource set; and
determining, by the terminal device based on the mapping manner information of the first control resource set, a mapping manner between a control channel element (CCE) in the first control resource set and resource element groups (REGs) in the first control resource set, wherein a REG in the first control resource set occupies one symbol in time domain and occupies one resource block (RB) in frequency domain, wherein, the mapping manner information of the first control resource set indicates that the mapping manner of the first control resource set is interleaved mapping, REGs in an REG bundle numbered j in the first control resource set is numbered $m+jN_{REG}^{REG\text{-}bundle}$, where $j=0, 1, \ldots, N_{REG\text{-}bundle}^{CORESET}-1$ or $j=0, 1, \ldots, [N_{REG}^{CORESET}/N_{REG}^{REG\text{-}bundle}]$, $m=0, 1, \ldots N_{REG}^{REG\text{-}bundle}-1$ and $N_{REG\text{-}bundle}^{CORESET}=N_{REG}^{CORESET}/N_{REG}^{REG\text{-}bundle}$, where $N_{REG}^{CORESET}$ resents the number of REGs included in the first control resource set, $N_{REG}^{REG\text{-}bundle}$ represents the number of REGs included in an REG bundle, $N_{REG\text{-}bundle}^{CORESET}$ represents the number of REG bundles included in the first control resource set; and the REG bundle included in a CCE numbered n in the first control resource set is numbered $f(x,n,c)$, where $f(\bullet)$ indicates an interleaver, $x=0, 1, \ldots, N_{REG\text{-}bundle}^{CCE}-1$, $n=0, 1, \ldots N_{CCE}^{CORESET}-1$, and is equal to 2, 3, or 6, $N_{CCE}^{CORESET}$ represents the number of CCEs included in the first control resource set, $N_{REC\text{-}bundle}^{CCE}$ represents the number of REG-bundles included in a CCE in the first control resource set and $N_{CCE}^{CORESET}$ and $N_{REG\text{-}bundle}^{CCE}$ are positive integer.

2. The method according to claim 1, wherein the first search space is located in the first control resource set and includes $M_{p,k}^{(L)}$ PDCCH candidates with an aggregation L, and the physical downlink control channel (PDCCH) candidate numbered $m_{PDCCH}$ is one of the $M_{p,k}^{(L)}$ PDCCH candidates, where p represents the first control resource set and k represents transmission duration; and the method further comprises:

determining, by the terminal device based on the mapping manner information of the first control resource set, L CCEs in the PDCCH candidate numbered $m_{PDCCH}$ in the first search space, wherein L is a positive integer.

3. The method according to claim 2, wherein,

L=2, and the PDCCH candidate numbered $m_{PDCCH}$ includes 2 consecutively numbered CCEs, or L>2, and the PDCCH candidate numbered $m_{PDCCH}$ includes L CCEs, and at least two of the L CCEs are numbered non-consecutively.

4. The method according to claim 1, wherein the value of c is received from a network via signaling.

5. The method according to claim 1, wherein the REGs in the first control resource set are numbered in a time-first manner.

6. A communication method, comprising:

determining, by a network device, a mapping manner between a control channel element (CCE) in a first control resource set and resource element groups (REGs) in the first control resource set, wherein a REG in the first control resource set occupies one symbol in time domain and occupies one resource block (RB) in frequency domain; and sending, by the network device, configuration information of the first control resource set, wherein the configuration information of the first control resource set comprises mapping manner information of the first control resource set, and wherein the mapping manner information of the first control resource set indicates the mapping manner between the CCE and the REGs in the first control resource set, wherein, the mapping manner information of the first control resource set indicates that the mapping manner of the first control resource set is interleaved mapping, REGs in an REG bundle numbered j in the first control resource set is numbered $m+jN_{REG}^{REG\text{-}bundle}$, where $j=0, 1, \ldots, N_{REG\text{-}bundle}^{CORESET}-1$, $m=0, 1, \ldots N_{REG}^{REG\text{-}bundle}-1$ and $N_{REG\text{-}bundle}^{CORESET}=N_{REG}^{CORESET}/N_{REG}^{REG\text{-}bundle}$, where $N_{REG}^{CORESET}$ represents the number of REGs included in the first control resource set, $N_{REG}^{REG\text{-}bundle}$ represents the number of REGs included in an REG bundle, $N_{REG\text{-}bundle}^{CORESET}$ represents the number of REG bundles included in the first control resource set; and the REG bundles included in a CCE numbered n in the first control resource set is numbered $f(x,n,c)$, where $f(\bullet)$ indicates an interleaver, $x=0, 1, \ldots, N_{REG\text{-}bundle}^{CCE}-1$, $n=0, 1, \ldots, N_{CCE}^{CORESET}-1$ and c is 2, 3, or 6, $N_{CCE}^{CORESET}$ represents the number of CCEs included in the first control resource set, $N_{REG\text{-}bundle}^{CCE}$ represents the number of REG-bundles included in a CCE in the first control resource set and $N_{CCE}^{CORESET}$ and $N_{REG\text{-}bundle}^{CCE}$ are positive integer.

7. The method according to claim 6, wherein a first search space is located in the first control resource set, the first search space comprises $M_{p,k}^{(L)}$ PDCCH candidates with an aggregation level L, a PDCCH candidate numbered $m_{pdcch}$ is one of the $M_{p,k}^{(l)}$ PDCCH candidates with the aggregation level L, and the mapping manner information of the first control resource set indicates L CCEs in a physical downlink control channel (PDCCH) candidate numbered $m_{PDCCH}$ in a first search space, wherein L is a positive integer.

8. The method according to claim 7, wherein,

L=2, and the PDCCH candidate numbered $m_{PDCCH}$ includes 2 consecutively numbered CCEs, or L>2, and the PDCCH candidate numbered $m_{PDCCH}$ includes L CCEs, and at least two of the L CCEs are numbered non-consecutively.

9. The method according to claim 6, wherein the value of c is sent to a terminal device via signaling.

10. The method according to claim 6, wherein the REGs in the first control resource set are numbered in a time-first manner.

11. An apparatus, comprising:

at least one processor; and a memory storing instructions executable by the at least one processor, wherein the instructions, when executed by the at least one processor, instruct the at least one processor to:

receive configuration information of a first control resource set, wherein the configuration information of the first control resource set comprises mapping manner information of the first control resource set;

determine based on the mapping manner information of the first control resource set that is received by the receiver, a mapping manner between a control channel element (CCE) in the first control resource set and resource element groups (REGs) in the first control resource set, wherein a REG in the first control resource set occupies one symbol in time domain and occupies one resource block (RB) in frequency domain, wherein, the mapping manner information of the first control resource set indicates that the mapping manner of the first control resource set is interleaved mapping, REGs in an REG bundle numbered j in the first control resource set is numbered $m+jN_{REG}^{REG\text{-}bundle}$, where $j=0, 1, \ldots N_{REG\text{-}bundle}^{CORESET}-1$, $m=0, 1, \ldots,$ $N_{REG}^{REG\text{-}bundle}-1$ and $N_{REG\text{-}bundle}^{CORESET}=N_{REG}^{CORESET}/N_{REG}^{REG\text{-}bundle}$, where $N_{REG}^{CORESET}$ represents the number of REGs included in the first control resource set, $N_{REG}^{REG\text{-}bundle}$ represents the number of REGs included in an REG bundle, $N_{REG\text{-}bundle}^{CORESET}$ represents the number of REG bundles included in the first control resource set; and the REG bundles included in a CCE numbered n in the first control resource set is numbered f(x,n,c), where f(•) indicates an interleaver, x=0, 1, . . . , $N_{REG\text{-}bundle}^{CCE}-1$, n=0, 1, . . . , $N_{CCE}^{CORESET}-1$ and c is 2, 3, 4, 6 or, 8, $N_{CCE}^{CORESET}$ represents the number of CCEs included in the first control resource set, $N_{REG\text{-}bundle}^{CCE}$ represents the number of REG-bundles included in a CCE in the first control resource set and $N_{CCE}^{CORESET}$ and $N_{REG\text{-}bundle}^{CCE}$ are positive integer.

12. The apparatus according to claim 11, wherein the first search space is located in the first control resource set and includes $M_{p,k}^{(L)}$ PDCCH candidates with an aggregation L, and the physical downlink control channel (PDCCH) candidate numbered $m_{PDCCH}$ is one of the $M_{p,k}^{(L)}$ PDCCH candidates, where p represents the first control resource set and k represents transmission duration; and the instructions further instruct the at least one processor to determine, based on the mapping manner information of the first control resource set, L CCEs in a physical downlink control channel (PDCCH) candidate numbered $m_{PDCCH}$ in a first search space, wherein L is a positive integer.

13. The apparatus according to claim 12, wherein,
L=2, and the PDCCH candidate numbered $m_{PDCCH}$ includes 2 consecutively numbered CCEs, or
L>2, and the PDCCH candidate numbered $m_{PDCCH}$ includes L CCEs, and at least two of the L CCEs are numbered non-consecutively.

14. The apparatus according to claim 11, wherein the value of c is received from a network via signaling.

15. The apparatus according to claim 11, wherein the REGs in the first control resource set are numbered in a time-first manner.

16. An apparatus, comprising:
at least one processor; and
a memory storing instructions executable by the at least one processor, wherein the instructions, when executed by the at least one processor, instruct the at least one processor to:
  determine a mapping manner between a control channel element (CCE) in a first control resource set and resource element groups (REGs) in the first control resource set, wherein a REG in the first control resource set occupies one symbol in time domain and occupies one resource block (RB) in frequency domain; and
  send configuration information of the first control resource set, wherein the configuration information of the first control resource set comprises mapping manner information of the first control resource set, and wherein the mapping manner information of the first control resource set indicates the mapping manner between the CCE and the REGs in the first control resource set, wherein,
the mapping manner information of the first control resource set indicates that the mapping manner of the first control resource set is interleaved mapping, REGs in an REG bundle numbered j in the first control resource set is numbered $M+jN_{REG}^{REG\text{-}bundle}$, where j=0, 1, . . . , $N_{REG\text{-}bundle}^{CORESET}-1$, m=0, 1, . . . , $N_{REG}^{REG\text{-}bundle}-1$ and $N_{REG\text{-}bundle}^{CORESET}=N_{REG}^{CORESET}/N_{REG}^{REG\text{-}bundle}$, where $N_{REG}^{CORESET}$ represents the number of REGs included in the first control resource set, $N_{REG}^{REG\text{-}bundle}$ represents the number of REGs included in an REG bundle, $N_{REG\text{-}bundle}^{CORESET}$ represents the number of REG bundles included in the first control resource set; and the REG bundles included in a CCE numbered n in the first control resource set is numbered f(x,n,c) where f(•) indicates an interleaver, x=0, 1, . . . $N_{REG\text{-}bundle}^{CCE}-1$, n=0, 1, . . . , $N_{CCE}^{CORESET}-1$, and c is 2, 3, or 6, $N_{CCE}^{CORESET}$ represents the number of CCEs included in the first control resource set, $N_{REG\text{-}bundle}^{CCE}$ represents the number of REG-bundles included in a CCE in the first control resource set and $N_{CCE}^{CORESET}$ and $N_{REG\text{-}bundle}^{CCE}$ are positive integer.

17. The apparatus according to claim 16, wherein:
a first search space is located in the first control resource set,
the first search space comprises $M_{p,k}^{(L)}$ PDCCH candidates with an aggregation level L,
a PDCCH candidate numbered $m_{pdcch}$ is one of the $M_{p,k}^{(L)}$ PDCCH candidates with the aggregation level L, and
the mapping manner information of the first control resource set indicates L CCEs in a physical downlink control channel (PDCCH) candidate numbered $m_{PDCCH}$ in a first search space, wherein L is a positive integer.

18. The apparatus according to claim 17, wherein,
L=2, and the PDCCH candidate numbered $m_{PDCCH}$ includes 2 consecutively numbered CCEs, or
L>2, and the PDCCH candidate numbered $m_{PDCCH}$ includes L CCEs, and at least two of the L CCEs are numbered non-consecutively.

19. The apparatus according to claim 16, wherein the value of c is sent to a terminal device via signaling.

20. The apparatus according to claim 16, wherein the REGs in the first control resource set are numbered in a time-first manner.

* * * * *

UNITED STATES PATENT AND TRADEMARK OFFICE
CERTIFICATE OF CORRECTION

| | | |
|---|---|---|
| PATENT NO. | : 11,356,992 B2 | Page 1 of 2 |
| APPLICATION NO. | : 16/786646 | |
| DATED | : June 7, 2022 | |
| INVENTOR(S) | : Chaojun Li and Yan Cheng | |

It is certified that error appears in the above-identified patent and that said Letters Patent is hereby corrected as shown below:

In the Claims

Column 47, Line 8, Claim 1, please delete "." and insert therefore -- ., --;

Column 47, Line 11, Claim 1, please delete "resents" and insert therefore -- represents --;

Column 47, Line 17, Claim 1, please delete "bundle" and insert therefore -- bundles --;

Column 47, Line 20, Claim 1, please delete "." and insert therefore -- ., --;

Column 47, Line 20, Claim 1, please delete "is" and insert -- c is --;

Column 47, Line 22, Claim 1, please delete "$N_{REC-bundle}^{CCE}$" and insert therefore -- $N_{REG-bundle}^{CCE}$ --;

Column 48, Line 4, Claim 6, please delete "." and insert therefore -- ., --;

Column 48, Line 16, Claim 6, please delete "1" and insert therefore -- 1, --;

Column 48, Line 25, Claim 7, please delete "$m_{pdcch}$" and insert therefore -- $m_{PDCCH}$ --;

Column 48, Line 26, Claim 7, please delete "$M_{p,k}^{(l)}$" and insert therefore -- $M_{p,k}^{(L)}$ --;

Column 48, Line 67, Claim 11, please delete "." and insert therefore -- ., --;

Column 49, Line 12, Claim 11, please delete "1" and insert therefore -- 1, --;

Column 50, Line 12 (Approx.), Claim 16, please delete "M" and insert therefore -- m --;

Column 50, Line 24, Claim 16, please delete "c)" and insert therefore -- c), --;

Signed and Sealed this
Twenty-fifth Day of June, 2024

*Katherine Kelly Vidal*

Katherine Kelly Vidal
*Director of the United States Patent and Trademark Office*

Column 50, Line 25, Claim 16, please delete "." and insert therefore -- ., --;

Column 50, Line 39 (Approx.), Claim 17, please delete "$m_{pdcch}$" and insert therefore -- $m_{PDCCH}$ --.